(12) United States Patent
Lee et al.

(10) Patent No.: US 12,422,980 B2
(45) Date of Patent: *Sep. 23, 2025

(54) MOBILE DEVICE AND OPERATING METHOD OF INPUT METHOD THEREOF

(71) Applicant: Getac Technology Corporation, New Taipei (TW)

(72) Inventors: Jiunn-Jye Lee, Taipei (TW); Ya-Wen Tsai, Taipei (TW)

(73) Assignee: Getac Technology Corporation, New Taipei (TW)

( * ) Notice: Subject to any disclaimer, the term of this patent is extended or adjusted under 35 U.S.C. 154(b) by 109 days.

This patent is subject to a terminal disclaimer.

(21) Appl. No.: 18/235,921

(22) Filed: Aug. 21, 2023

(65) Prior Publication Data

US 2024/0411447 A1 Dec. 12, 2024

(30) Foreign Application Priority Data

Jun. 7, 2023 (CN) .......................... 202310667733.X

(51) Int. Cl.
*G06F 3/04886* (2022.01)
*G06F 3/0481* (2022.01)
(Continued)

(52) U.S. Cl.
CPC ........ *G06F 3/04886* (2013.01); *G06F 3/0481* (2013.01); *G06K 7/1413* (2013.01); *G06V 30/14* (2022.01)

(58) Field of Classification Search
CPC . G06F 3/04886; G06F 3/0481; G06K 7/1413; G06V 30/14; G06V 30/10
See application file for complete search history.

(56) References Cited

U.S. PATENT DOCUMENTS 8,282,002 B2 10/2012 Shams
9,250,712 B1 * 2/2016 Todeschini .............. G06F 9/451
(Continued)

FOREIGN PATENT DOCUMENTS

CN 113139164 A 7/2021
TW 200634601 A 10/2006

OTHER PUBLICATIONS

TEC-IT: "Scanner Keyboard User Manual V3: Keyboard with Barcode, Text (OCR) and NFC Tag Scanner", Aug. 2, 2021 (Aug. 2, 2021), XP093133219, Retrieved from the Internet: URL: https://web.archive.org/web/20210802215251/https://www.tec-it.com/en/software/mobile-data-acquisition/barcode-keyboard/user-manual-3/Default.aspx [retrieved on Feb. 20, 2024] *the whole document*.

*Primary Examiner* — Cao H Nguyen
(74) *Attorney, Agent, or Firm* — Troutman Pepper Locke LLP; Tim Tingkang Xia, Esq.

(57) ABSTRACT

A mobile device and operating method of input method thereof is related to the mobile device, which includes a general camera module, a specific camera module, a barcode-decoding module, a touch display module, and a control module. The barcode-decoding module is configured to capture one or more barcode patterns through the specific camera module and convert each of the barcode patterns into one or more first string. The touch display module is configured to display a display frame having an input field. The control module is configured to activate a virtual keyboard window of a system default input method and a trigger element of an image conversion input method in response to an input trigger event and control the touch display module to display an overlapping window of the image conversion input method on the display frame overlappingly in response to a first trigger event.

21 Claims, 22 Drawing Sheets

(51) Int. Cl.
    *G06K 7/14*         (2006.01)
    *G06V 30/14*      (2022.01)

(56)            References Cited

U.S. PATENT DOCUMENTS

| | | |
|---|---|---|
| 10,216,286 B2 | 2/2019 | Chornenky |
| 11,029,838 B2 | 6/2021 | Lemay et al. |
| 11,495,036 B1 * | 11/2022 | Kündig ................ G06V 30/148 |
| 2013/0001297 A1 | 1/2013 | Snyder et al. |
| 2017/0052939 A1 | 2/2017 | Seol et al. |
| 2017/0300128 A1 | 10/2017 | Göktekin |
| 2021/0019061 A1 * | 1/2021 | Hiltgen ................ G06F 3/0632 |
| 2021/0044730 A1 | 2/2021 | Biasini et al. |
| 2022/0318036 A1 | 10/2022 | Zhang et al. |
| 2023/0082683 A1 * | 3/2023 | Wang .................... G06Q 20/18 |
| | | 715/740 |

\* cited by examiner

MOBILE DEVICE AND OPERATING METHOD OF INPUT METHOD THEREOF

CROSS-REFERENCE TO RELATED APPLICATION

This non-provisional application claims priority under 35 U.S.C. § 119 (a) to patent application No. 202310667733.X filed in China, P.R.C. on Jun. 7, 2023, the entire contents of which are hereby incorporated by reference.

BACKGROUND OF THE INVENTION

The present disclosure relates to an image conversion input method, and particularly relates to a mobile device and an operating method of an input method thereof.

In order to meet the special needs in the market, some companies have developed applications with barcode-scanning function and/or optical character recognition (OCR) function, so that the applications can be applied to various types of mobile devices (for example, smartphones, tablet PCs, or industrial touch PCs). However, these applications are not convenient to use. For example, when a user wants to convert a barcode pattern or a character pattern into a string through the application so as to input the string into an input field of another application (for example, Facebook, or Google Chrome), the user needs to open a window frame of the application and another window frame of the another application alternately to complete the above operation.

SUMMARY OF THE INVENTION

In order to address the problem(s) mentioned above, the present disclosure provides a mobile device and an operating method of an input method thereof. In one or some embodiments, the mobile device integrates an application which has a barcode-scanning function and/or an OCR function (hereinafter, abbreviated as an image conversion input method) into an input method of the mobile device so as to obtain contents represented by a barcode and/or an image by using the barcode-scanning function and/or the OCR function and input the obtained content into the input field directly. Therefore, the convenience of using the image conversion input method can be improved.

In some embodiments, a mobile device includes a general camera module, a specific camera module, a barcode-decoding module, a touch display module, and a control module. The barcode-decoding module is electrically connected to the specific camera module, wherein the barcode-decoding module is configured to capture at least one barcode pattern through the specific camera module and convert the at least one barcode pattern into at least one first string, wherein each of the at least one barcode pattern is generated by using the specific camera module to capture at least one barcode. The touch display module is configured to display a display frame, wherein the display frame has an input field. The control module is electrically connected to the general camera module, the specific camera module, and the touch display module, wherein the control module is configured to activate a virtual keyboard window of a system default input method and a trigger element of an image conversion input method in response to an input trigger event of the input field, and the control module is configured to control the touch display module to display an overlapping window of the image conversion input method on the display frame overlappingly in response to a first trigger event of the trigger element.

In some embodiments, the trigger element is a virtual button, and the virtual button, the input field, and the virtual keyboard window are displayed on the display frame at the same time.

In some embodiments, the control module is further configured to control the touch display module to hide the overlapping window displayed on the display frame in response to a recurrence of the first trigger event.

In some embodiments, the first trigger event is a short press operation.

In some embodiments, the control module is further configured to control the touch display module to display a setting window of the image conversion input method in response to a second trigger event of the trigger element.

In some embodiments, the second trigger event is a long press operation.

In some embodiments, the mobile device further includes at least one selection button, wherein the specific camera module is configured to capture a preview frame having the at least one barcode pattern, the control module is further configured to activate the barcode-decoding module in response to a barcode selection event of the at least one selection button, and the control module is further configured to display the preview frame in the overlapping window in a real-time manner after the control module activates the barcode-decoding module and display one of the at least one first string in the input field.

In some embodiments, the at least one barcode pattern includes a plurality of barcode patterns, the overlapping window further has a candidate field, the candidate field is above the overlapping window, and the control module is further configured to display the at least one first string as input options of the input field in the candidate field after the control module activates the barcode-decoding module.

In some embodiments, the mobile device further includes a character recognition engine disposed between the general camera module and the control module, wherein the character recognition engine is configured to capture at least one string pattern and another preview frame having the at least one string pattern through the general camera module, and the character recognition engine is configured to recognize and convert each of the at least one string pattern into at least one second string, and wherein each string pattern is generated by using the general camera module to capture at least one character.

In some embodiments, the control module is further configured to activate the character recognition engine correspondingly in response to a character selection trigger event of the at least one selection button, and the control module is configured to display the another preview frame in the overlapping window in a real-time manner after the control module activates the character recognition engine and display one of the at least one second string in the input field.

In some embodiments, the overlapping window includes an enlargement button, and the control module is further configured to control the touch display module to enlarge and display the overlapping window in response to an enlargement trigger event of the enlargement button.

In some embodiments of the present disclosure also provides an operating method of an input method for the mobile device. The operating method includes: displaying an input field on a display frame; activating a system default input method and an image conversion input method through the input field in order to display the input field, a virtual keyboard window of the system default input method, and a trigger element of the image conversion input method on the display frame at the same time, wherein the trigger element is a virtual button; and controlling a touch display module to display an overlapping window of the image conversion input method on the display frame overlappingly in response to a first trigger event of the trigger element, wherein the overlapping window is linked to a general camera module or a specific camera module.

In some embodiments, the operating method further includes: controlling the touch display module to hide the overlapping window displayed on the display frame in response to a recurrence of the first trigger event.

In some embodiments, the operating method further includes: controlling the touch display module to display a setting window of the image conversion input method in response to a second trigger event of the trigger element.

In some embodiments, the image conversion input method includes a barcode-scanning input method, and the operating method further includes: activating the barcode-scanning input method in response to a barcode selection event; scanning at least one barcode through the barcode-scanning input method to obtain at least one first string, wherein the step of scanning the at least one barcode through the barcode-scanning input method includes: capturing the at least one barcode through the specific camera module to obtain at least one barcode pattern of the at least one barcode; and decoding the at least one barcode pattern into the at least one first string through a barcode-decoding module; and displaying one of the at least one first string in the input field.

In some embodiments, the step of capturing the at least one barcode through the specific camera module, a preview frame having the at least one barcode pattern is further obtained, and the step of scanning at least one barcode through the barcode scanning input method further includes: previewing and displaying the preview frame in the overlapping window.

In some embodiments, the at least one first string includes a plurality of first strings, the overlapping window further has a candidate field, the candidate field is above the overlapping window, and the operating method further includes: displaying the plurality of first strings as input options of the input field in the candidate field.

In some embodiments, the image conversion input method further includes a character recognition input method, the mobile device further includes a character recognition engine, and the operating method further includes: activating the character recognition input method in response to a character selection event; detecting at least one character through the character recognition input method to obtain at least one second string, wherein the step of detecting at least one character through the character recognition input method includes: capturing the at least one character through the general camera module to obtain at least one string pattern of the at least one character and another preview frame which has the at least one string pattern; previewing and displaying the another preview frame in the overlapping window; and recognizing and converting the at least one string pattern into the at least one second string through the character recognition engine; and displaying one of the at least one second string in the input field.

In some embodiments, the overlapping window includes an enlargement button, and the operating method further includes: enlarging and displaying the overlapping window in response to an enlargement trigger event of the enlargement button.

In conclusion, according to any one of embodiments, the mobile device or the operating method of the input method thereof have both the system default input method and the image conversion input method so as to provide diverse input functions. Therefore, the user can select an appropriate input method for input operations (such as but not limited to a Chinese/English input, a barcode-scanning input, or an OCR input) when performing a character input of any one of input fields so as to improve the convenience and the efficiency of the character input.

DETAILED DESCRIPTION OF THE INVENTION

Figure 1:
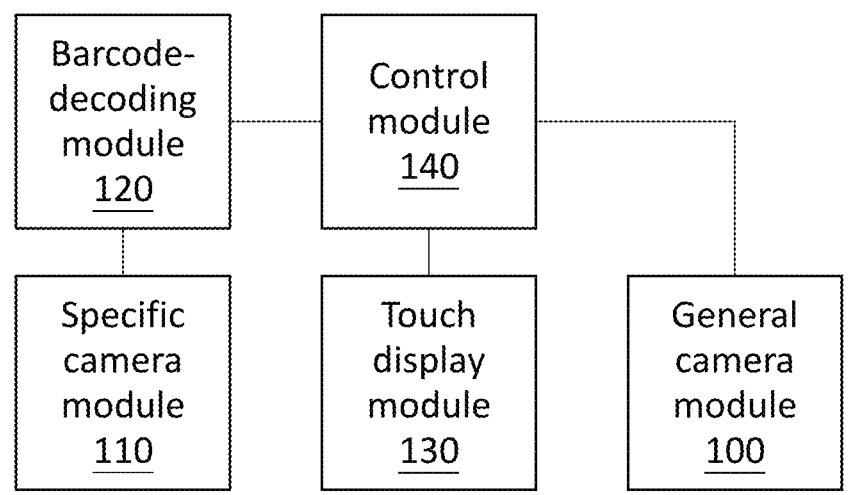
FIG. 1 illustrates a module block diagram of a first embodiment of a mobile device according to the present disclosure.

Please refer to FIG. 1. A mobile device 10 having various input methods (hereinafter abbreviated as mobile device 10) is provided, and the mobile device 10 can provide various input operations such as virtual keyboard and image conversion (for example, barcode-scanning and/or character recognition). The mobile device includes a general camera module 100, a specific camera module 110, a barcode-decoding module 120, a touch display module 130, and a control module 140. In some embodiments, the barcode-decoding module 120 is electrically connected between the specific camera module 110 and the control module 140, and the control module 140 is electrically connected to the general camera module 100, barcode-decoding module 120, and the touch display module 130.

Herein, the barcode-decoding module 120 can capture at least one barcode pattern through the specific camera module 110 and convert each of the at least one barcode patterns into at least one string (hereinafter referred to as first strings).

Figure 2:
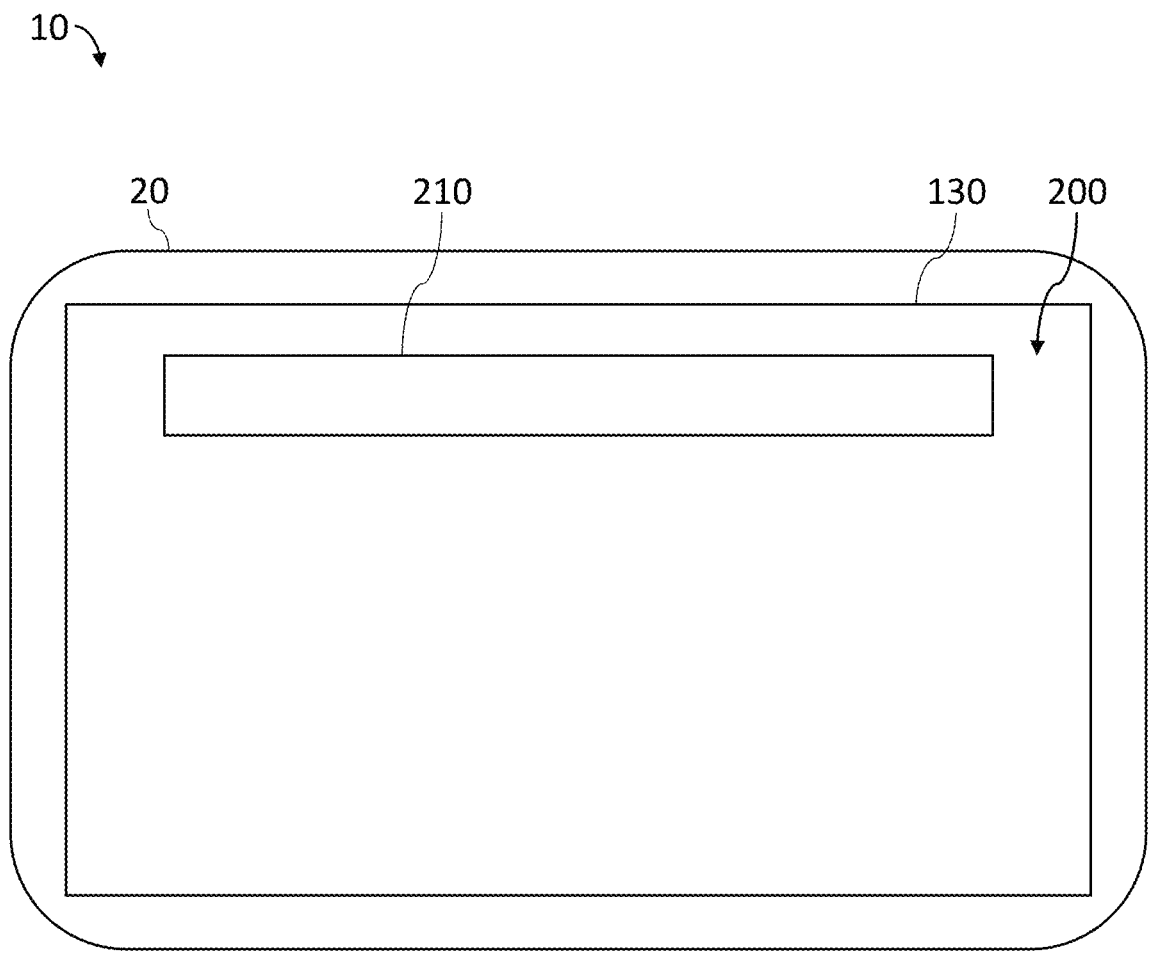
FIG. 2 illustrates a schematic front plan view of an implementation of the mobile device in FIG. 1.
Figure 3:
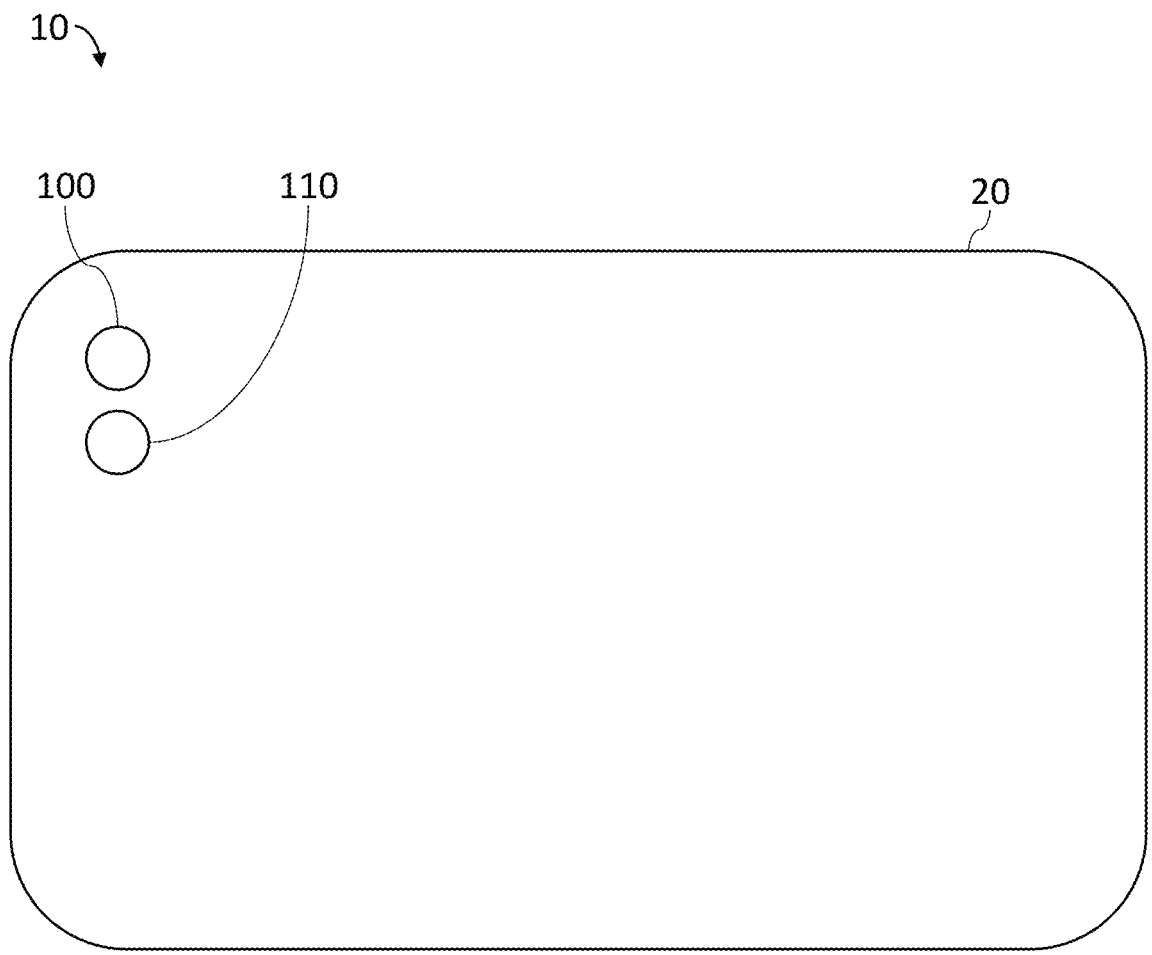
FIG. 3 illustrates a schematic rear plan view of an implementation of the mobile device in FIG. 1.

Please refer to FIG. 1 to FIG. 3. In some embodiments, the mobile device 10 includes a housing 20. In some embodiments, the touch display module 130 is embedded on the front surface of the housing 20 (as shown in FIG. 2), the general camera module 100 and the specific camera module 110 are embedded on the housing 20, and the barcode-decoding module 120 and the control module 140 are disposed in the housing 20 (not shown).

In some embodiments, the general camera module 100 may be embedded on the back surface of the housing 20 (as shown in FIG. 3). In some embodiments, the general camera module 100 may also be embedded on the front surface of the housing 20 (not shown).

In some embodiments, the specific camera module 110 may be embedded on the back surface of the housing 20 (as shown in FIG. 3). In some embodiments, the specific camera module 110 may also be embedded on the front surface of the housing 20 (not shown).

In some embodiments, the mobile device 10 may be a device having a touch function and a character input application, such as but not limited to a smartphone, a tablet computer, or a touch computer. In some embodiments, the general camera module 100 may be a front camera or a rear camera on the mobile device 10 which is normally configured to take pictures or record videos.

Figure 4:
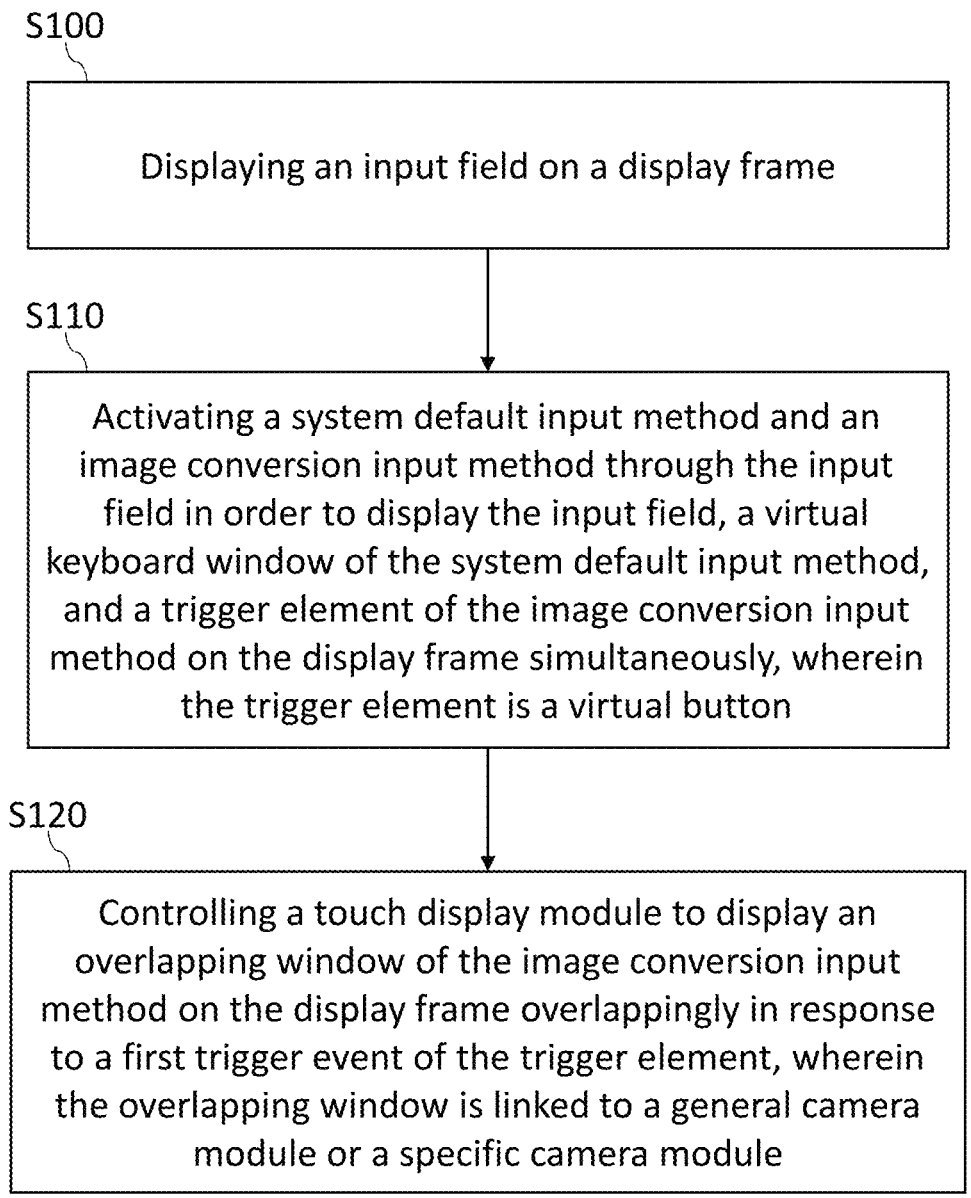
FIG. 4 illustrates a flow chart of a mobile device according to some embodiments of the present disclosure.
Figure 5:
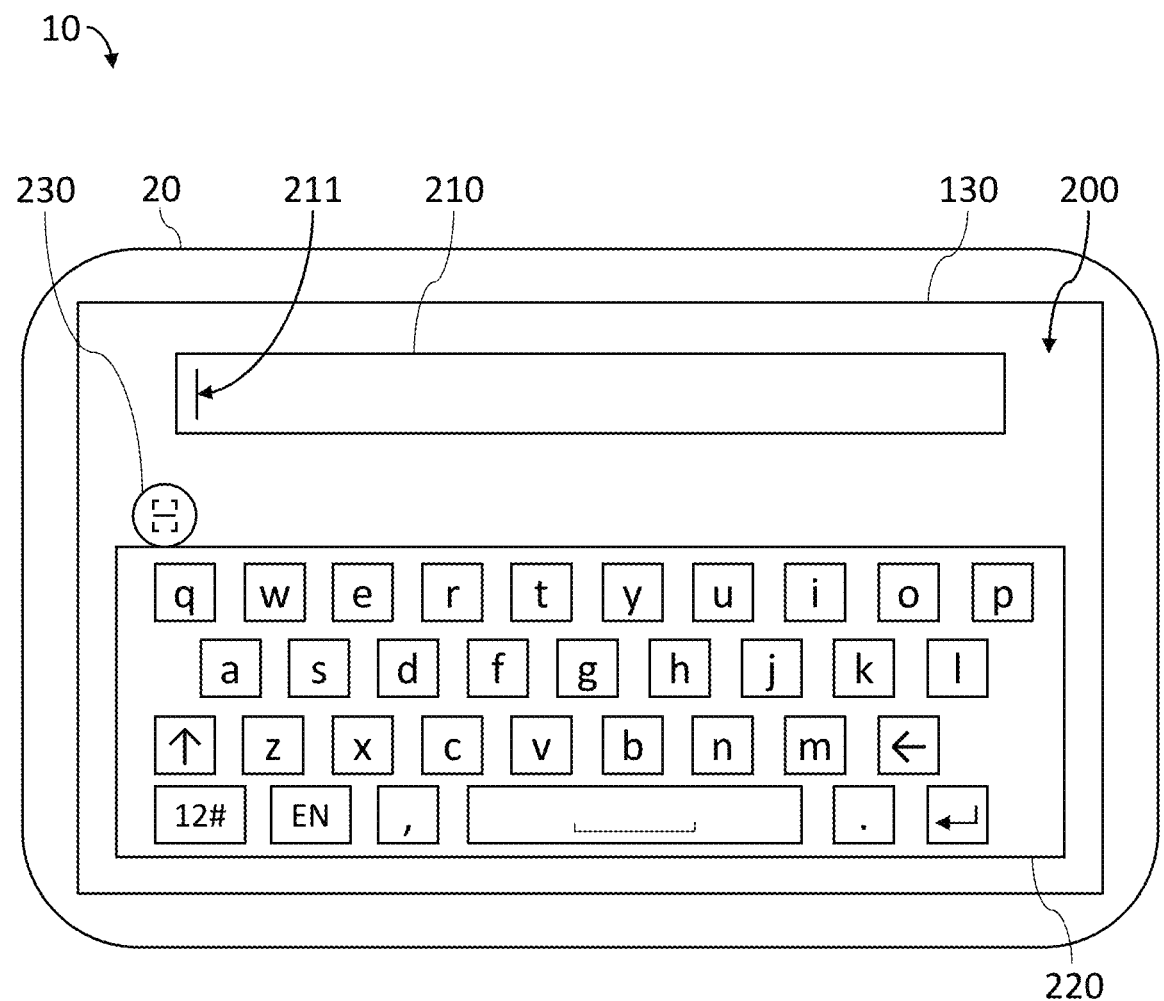
FIG. 5 illustrates a schematic view of an implementation of an input field in FIG. 2 after being processed via the step S110 in FIG. 4.

Please refer to FIG. 1 to FIG. 6, when the mobile device 10 starts operating, the touch display module 130 displays an input field 210 on a display frame 200 (the step S100, as shown in FIG. 5).

In some embodiments, the size of the display frame 200 is not larger than the size of the screen of the touch display module 130. For example, the size of the display frame 200 may be substantially equal to the size of the touch display module 130 (as shown in FIG. 2).

In some embodiments, the input field 210 may be a desktop widget constantly configured on the desktop and provided by an operating system or an application of the mobile device 10 (such as but not limited to a search bar on the main frame of the mobile device 10), a field of the application or a search engine in a webpage (such as but not limited to an App Store search engine or a Google search engine), or a character input page or field in the application or the webpage (such as but not limited to an input page of Word Application or a field for creating a post of Facebook Application).

After the step S100, the mobile device 10 triggers the control module 140 to activate a system default input method and an image conversion input method through the input field 210 so as to control the touch display module 130 to display the input field 210, a virtual keyboard window 220 of the system default input method, and a trigger element 230 of the image conversion input method on the display frame 200 at the same time (the step S110, as shown in FIG. 5). In some embodiments, the trigger element 230 is a virtual button, and the system default input method and the image conversion input method are linked to the input field.

It should be noticed that sequences between two events which occurred at the same time may have a short delay time. In some embodiments, the short delay time is below than 500 milliseconds (ms). For example, the trigger element 230 of the image conversion input method is displayed on the display frame 200 in 500 milliseconds after that the input field 210 and the virtual keyboard window 220 of the system default input method have been displayed on the display frame 200.

In some embodiments, the trigger element 230 may be disposed in the display frame 200 floatingly. In some embodiments, the trigger element 230 may also be disposed in the display frame 200 fixedly; for example, the trigger element 230 is located at the middle position of the display frame 200 fixedly which is adjacent to the left side.

Figure 6:
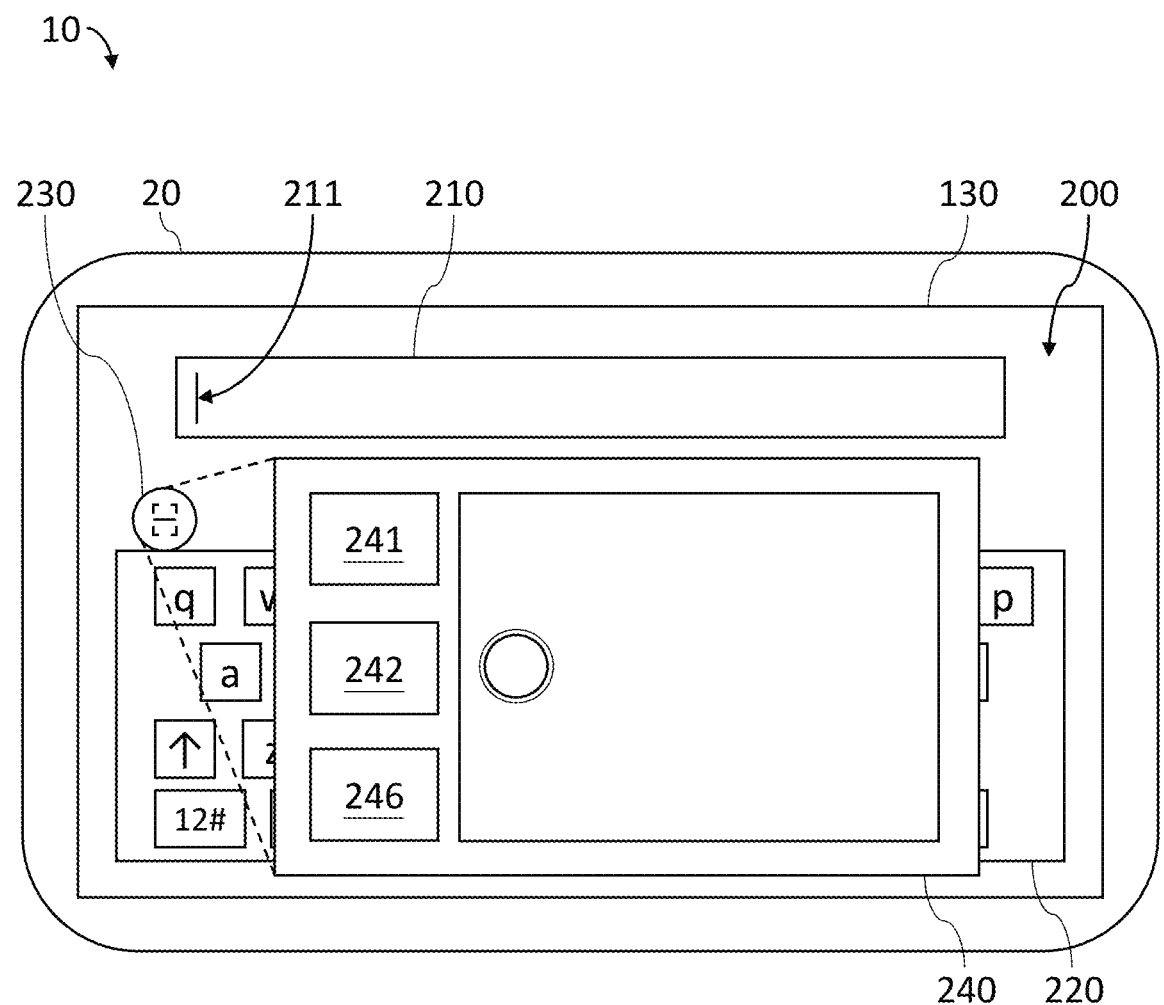
FIG. 6 illustrates a schematic view of an implementation of a trigger element in FIG. 2 after being processed via the step S120 in FIG. 4.
Figure 7:
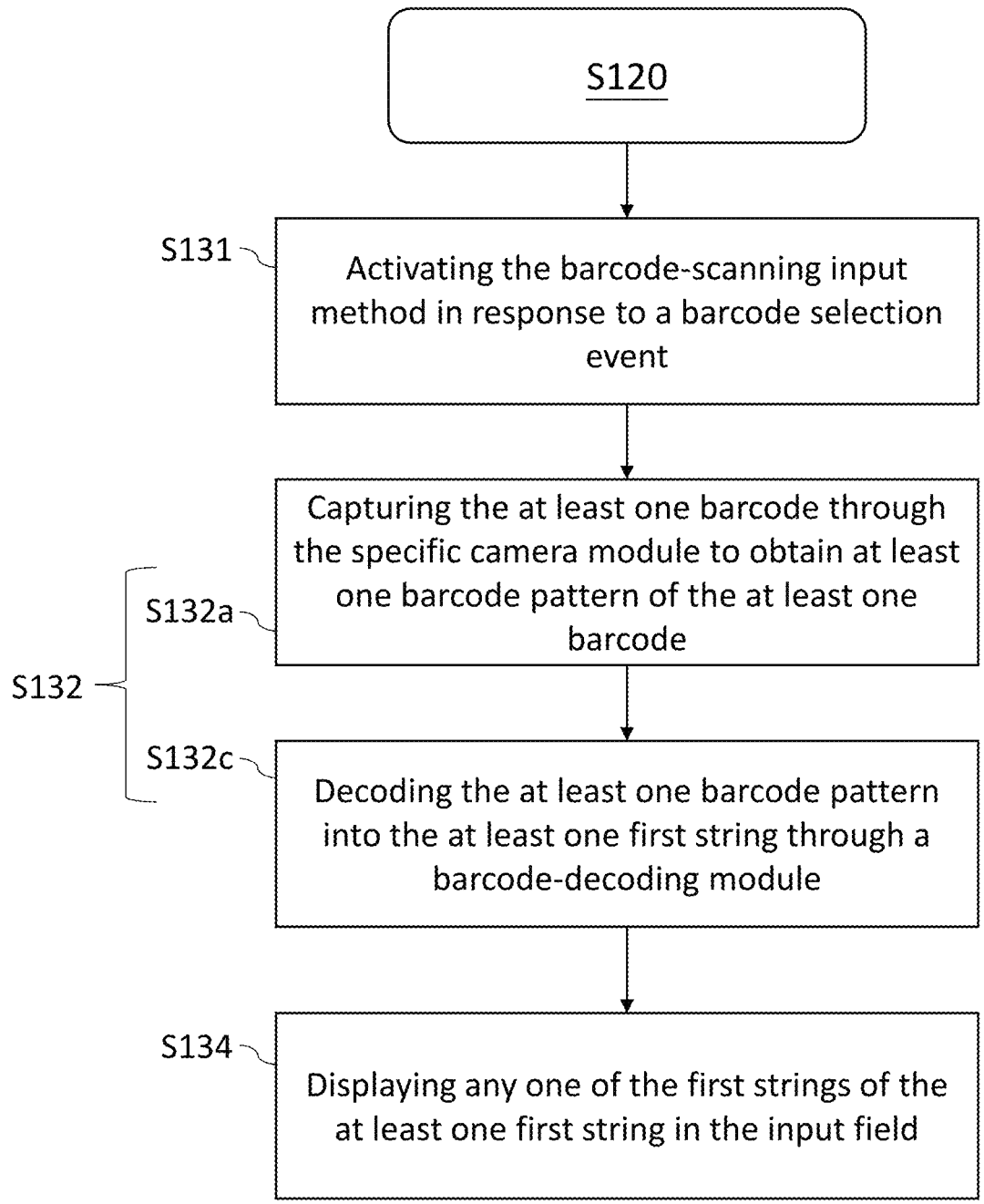
FIG. 7 illustrates a flow chart of a first embodiment following the step S120 in FIG. 4.
Figure 8:
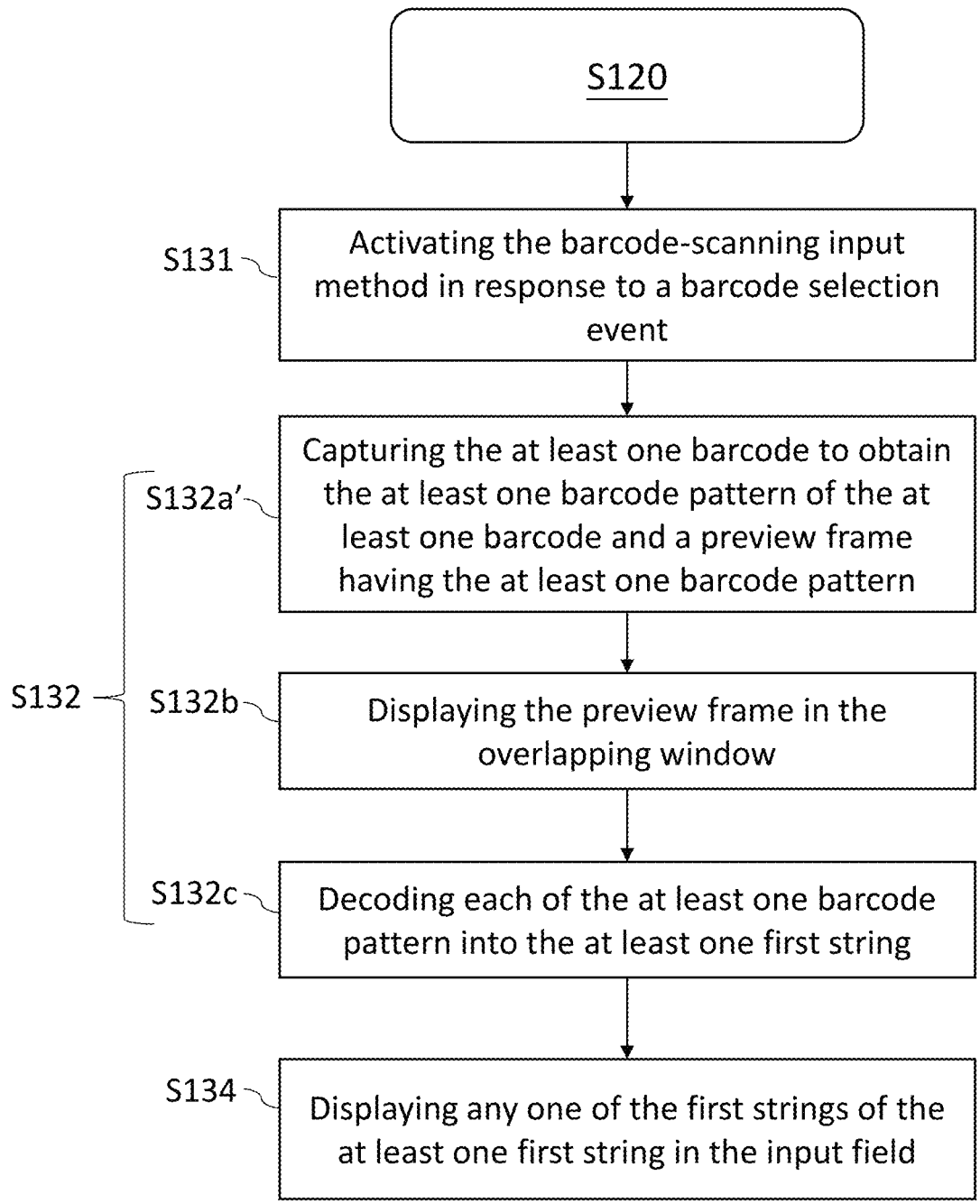
FIG. 8 illustrates a flow chart of a second embodiment following the step S120 in FIG. 4.

After the step S110, the control module 140 controls the touch display module 130 to display an overlapping window 240 of the image conversion input method on the display frame 200 overlappingly in response to a first trigger event of the trigger element 230 (the step S120, as shown in FIG. 6). In some embodiments, the overlapping window 240 is linked to the general camera module 100 or the specific camera module 110.

In some embodiments, the overlapping window 240 may be a window extending from the trigger element 230. In some embodiments, the overlapping window 240 may be located at the upper layer of the virtual keyboard window 220 fixedly and overlappingly, or the overlapping window 240 may be located at the upper layer of the virtual keyboard window 220 floatingly and overlappingly.

Take the input field 210 as the search bar on the main frame of the mobile device as an example. When a user clicks the input field 210, the control module 140 controls the touch display module 130 to display a cursor 211 in the input field 210 in response to the click event of the user, and the virtual keyboard window 220 of the system default input method is emerged from the bottom of the display frame 200. Meanwhile, the virtual button of the image conversion input method (i.e., the trigger element 230, as shown in FIG. 5) is displayed on any position in the display frame 200 floatingly or fixedly. Then, when the user presses the trigger element 230 once (i.e., in this embodiment, the first trigger event), the overlapping window 240 which is located at the upper layer of the virtual keyboard window 220 and overlaps the virtual keyboard window 220 will appear on the touch display module 130.

Please refer to FIG. 6. In some embodiments, the mobile device 10 further includes at least one selection button 241, 242, and the image conversion input method includes a barcode-scanning input method. In other words, in some embodiments, the mobile device 10 has a barcode-scanning function.

Please refer to FIG. 1, FIG. 4, FIG. 6, and FIG. 7. In some embodiments, after the step S120, the control module 140 activates the barcode-scanning input method in response to a barcode selection event for one selection button 241 of the at least one selection button 241, 242 (the step S131). In other words, in some embodiments, the selection button 241 corresponds to the barcode-scanning function. In some embodiments, the selection button 241 corresponding to the barcode-scanning function can be a physical button of the mobile device 10 or a virtual button on the overlapping window 240. Take the selection button 241 being the virtual button as an example, the barcode selection event may be that the user clicks the virtual button once.

After the step S131, the mobile device 10 scans the at least one barcode through the barcode-scanning input method to obtain at least one first string (the step S132).

In some embodiments of the step S132, the specific camera module 110 captures the at least one barcode to obtain at least one barcode pattern 31 of the at least one barcode (the step S132a). Then, the at least one barcode pattern 31 will be transmitted to the barcode-decoding module 120, and the barcode-decoding module 120 decodes each of the at least one barcode pattern 31 into the at least one first string (the step S132c).

Figure 9:
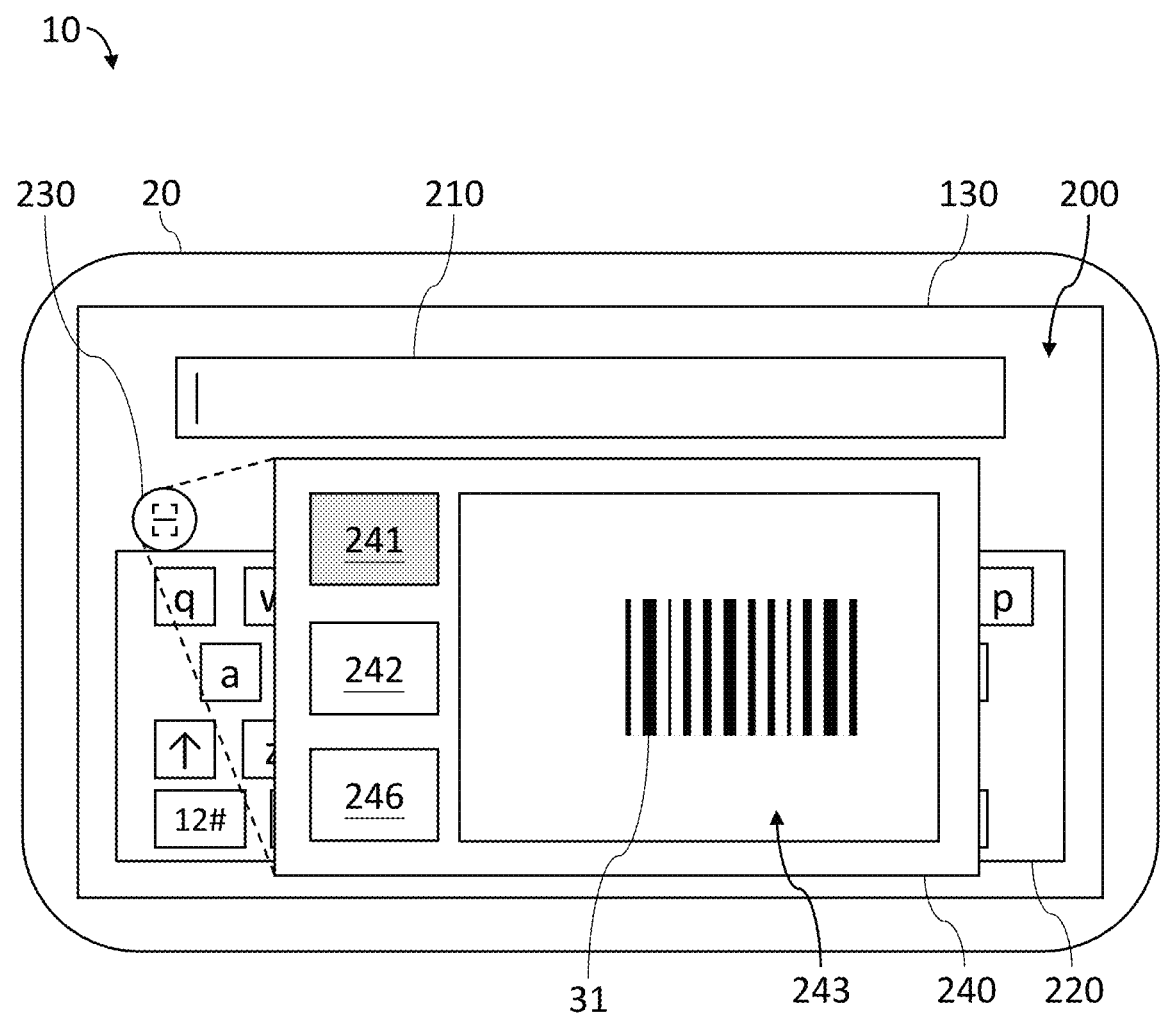
FIG. 9 illustrates a schematic view of an implementation of an overlapping window in FIG. 6 after being processed via the step S132a' and the step S132b in FIG. 8.

Please refer to FIG. 1, FIG. 4, FIG. 6, and FIG. 8. In other embodiments of the step S132, the specific camera module 110 captures the at least one barcode to obtain the at least one barcode pattern 31 of the at least one barcode and to obtain a preview frame 243 having the at least one barcode pattern 31 (the step S132a'). Then, the control module 140 of the mobile device 10 controls the touch display module 130 to preview and display the preview frame 243 in the overlapping window 240 in a real-time manner (the step S132b, as shown in FIG. 9) so as to facilitate the user to confirm the barcode aligned with the specific camera module 110. After that, the control module 140 transmits the at least one barcode pattern 31 to the barcode-decoding module 120, and the barcode-decoding module 120 decodes each of the at least one barcode pattern 31 into the at least one first string (the step S132c).

Figure 10:
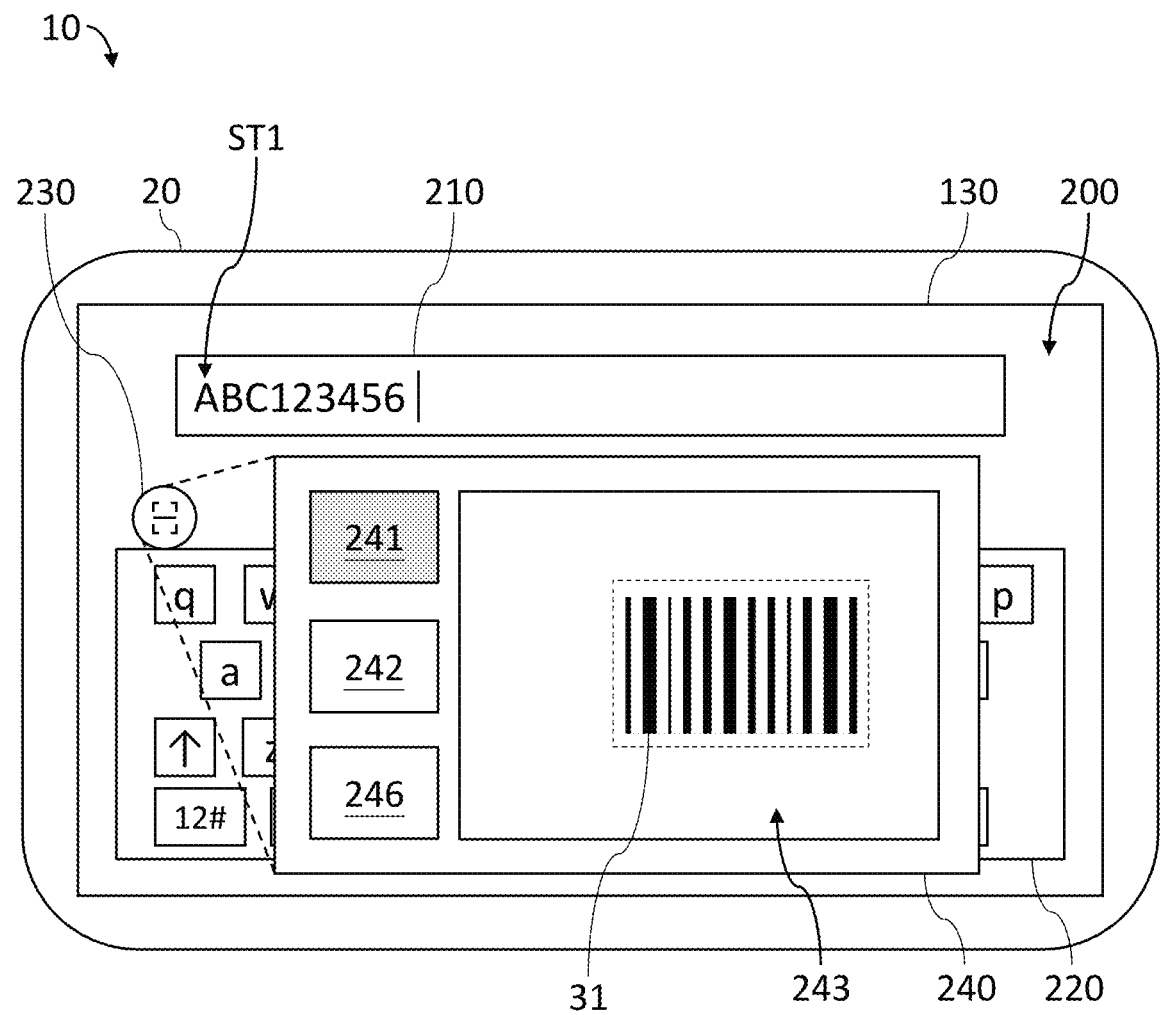
FIG. 10 illustrates a schematic view of an implementation of an overlapping window in FIG. 6 after being processed via the step S132c and the step S134 in FIG. 8.

After the step S132, the control module 140 receives the first strings output by the barcode-decoding module 120 and controls the touch display module 130 to display any one of the first strings ST1 of the at least one first string in the input field 210 (the step S134, as shown in FIG. 10).

Take one barcode as an example, a barcode information carried by the barcode is "ABC123456". In this embodiment, the specific camera module 110 captures the barcode to obtain a barcode pattern 31 of the barcode, and the barcode-decoding module 120 decodes the obtained barcode pattern 31 to obtain the first string ST1 carrying "ABC123456".

In some embodiments, when the specific camera module 100 captures a plurality of barcodes at one time (i.e., the at least one barcode pattern includes a plurality of barcode patterns), the touch display module 130 displays the first string represented by the barcode pattern located at a specified position in the preview frame 243 (for example, the barcode pattern overlapping the center of the preview frame 243) in the input field 210.

Figure 11:
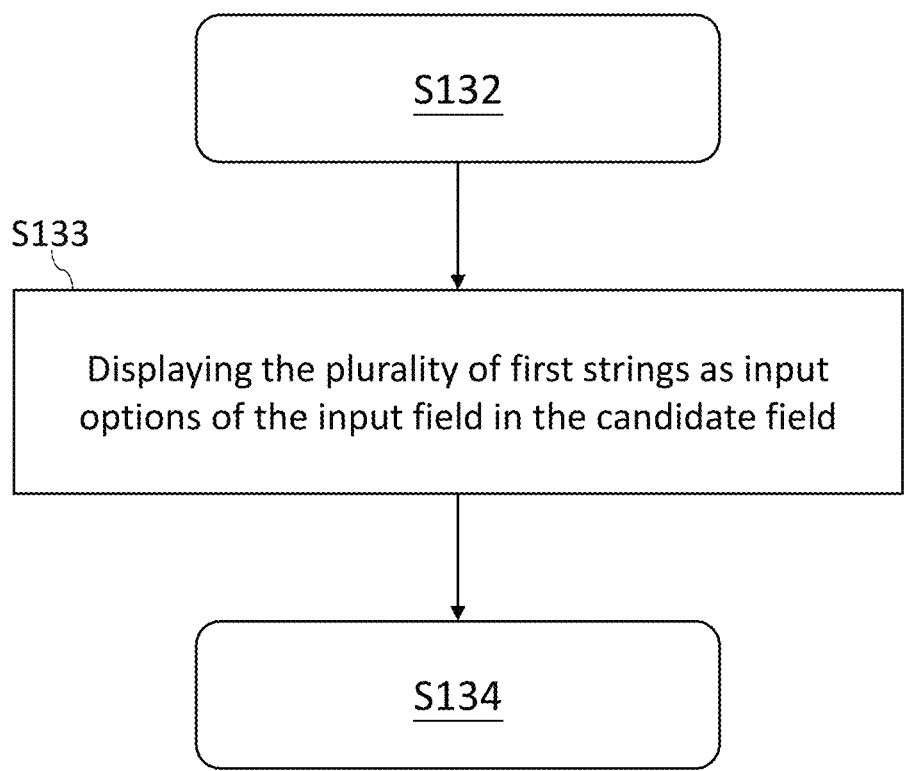
FIG. 11 illustrates a flow chart of an embodiment following the step S132 in FIG. 8.
Figure 12:
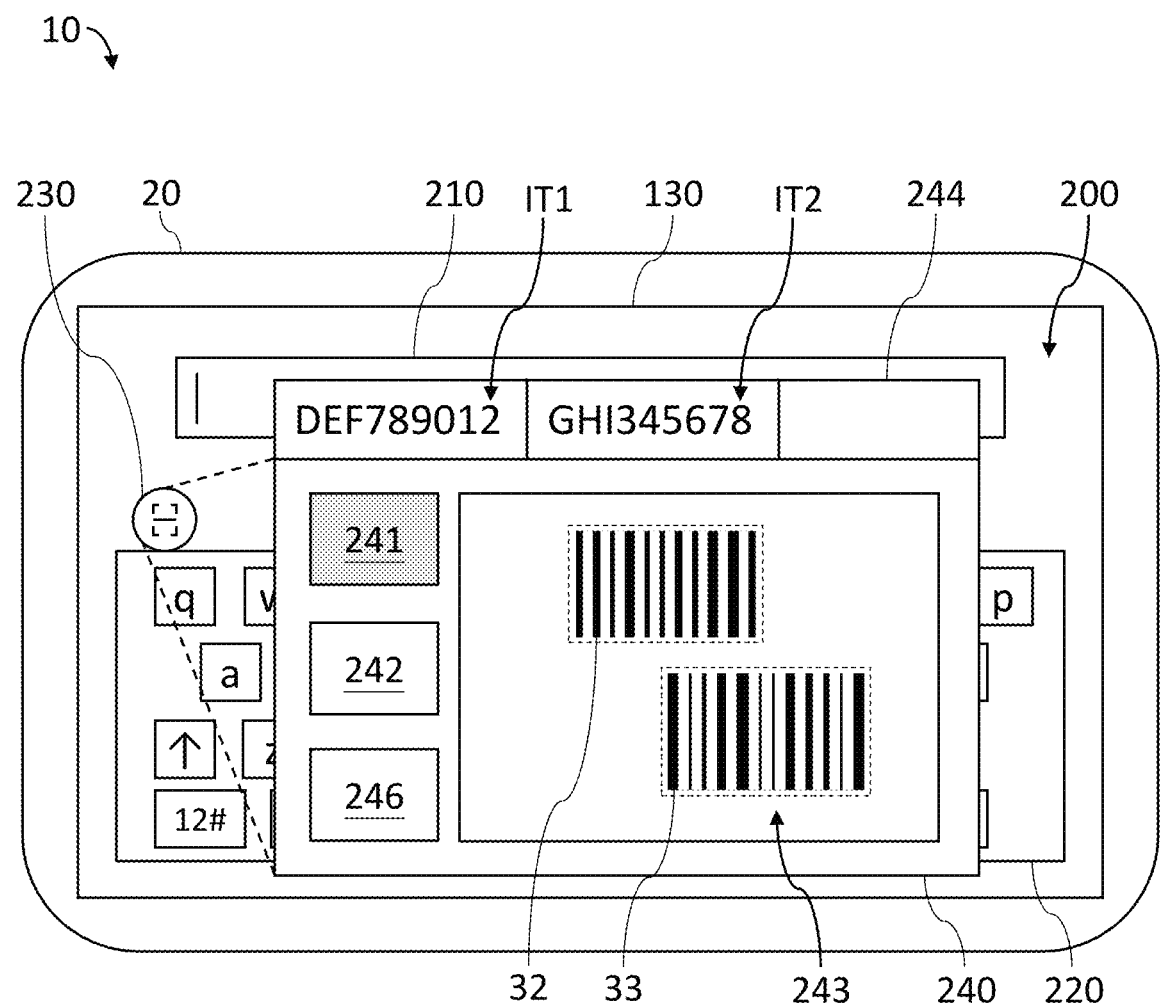
FIG. 12 illustrates a schematic view of an implementation of an overlapping window in FIG. 9 after being processed via the step S134 in FIG. 11.

Please refer to FIG. 1, FIG. 4, FIG. 9, FIG. 11, and FIG. 12. In some embodiments, the at least one first string includes a plurality of first strings, and the overlapping window 240 further has a candidate field 244. In some embodiments, the candidate field 244 is above the overlapping window 240 (as shown in FIG. 12). In other words, in some embodiments, the specific camera module 110 captures a plurality of barcodes at one time to obtain the plurality of barcode patterns 32, 33 correspondingly. At this moment, in the step S132c, the barcode-decoding module 120 decodes the barcode patterns 32, 33 of the plurality of barcodes into the plurality of first strings, and the control module 140 controls the touch display module 130 to display the plurality of first strings as input options IT1, IT2 of the input field 210 in the candidate field 244 (the step S133, as shown in FIG. 11).

Take that the specific camera module 110 captures two barcodes as an example (as shown in FIG. 12), barcode information carried by the two barcodes are "DEF789012" and "GHI345678", respectively. At this moment, the candidate field 244 has two input options IT1, IT2, wherein one input option IT1 is the first string "DEF789012" converted by the barcode pattern 32, and the other input option IT2 is the first string "GHI345678" converted by the barcode pattern 33. Specifically, in this embodiment, when the mobile device 10 captures the two barcode patterns 32, 33, the barcode-decoding module 120 decodes the two barcode patterns 32, 33 into the first string "DEF789012" and the first string "GHI345678", respectively. The two first strings are displayed in the candidate field 244 as input options IT1, IT2, so that one of the two first strings can be selected to be input into the input field 210.

Figure 13:
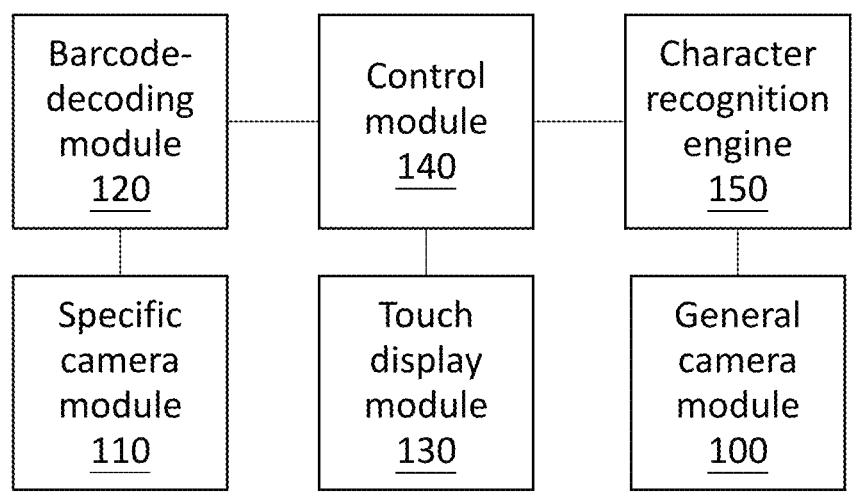
FIG. 13 illustrates a module block diagram of a second embodiment of a mobile device according to the present disclosure.

Please refer to FIG. 13. In some embodiments, the image conversion input method further includes a character recognition input method, and the mobile device 10 further includes a character recognition engine 150. In some embodiments, the character recognition 150 is electrically connected between the general camera module 100 and the control module 140 and is disposed in the housing 20 (not shown). In other words, in some embodiments, the mobile device 10 has an optical character recognition (OCR) function.

Figure 14:
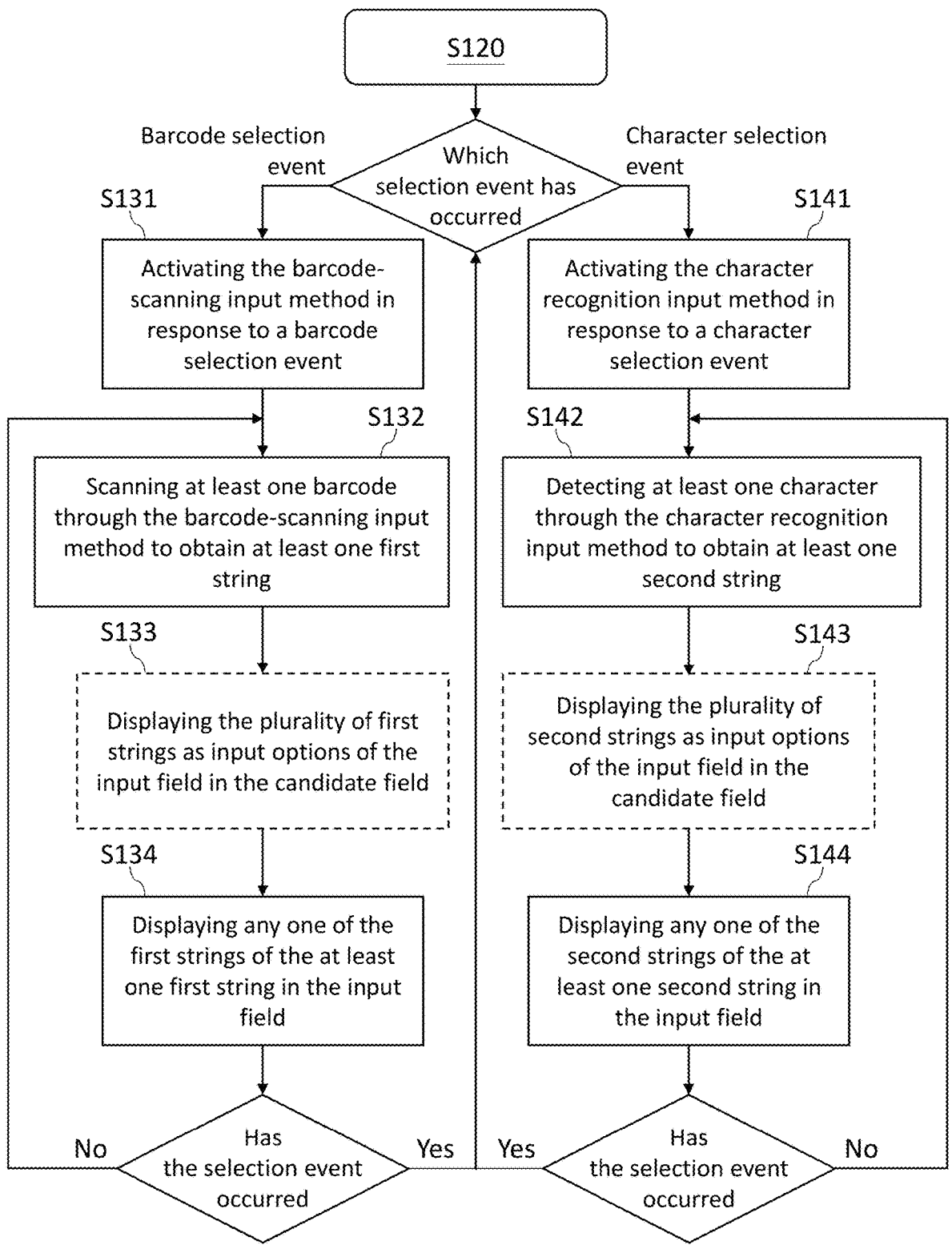
FIG. 14 illustrates a flow chart of a third embodiment following the step S120 in FIG. 4.
Figure 15:
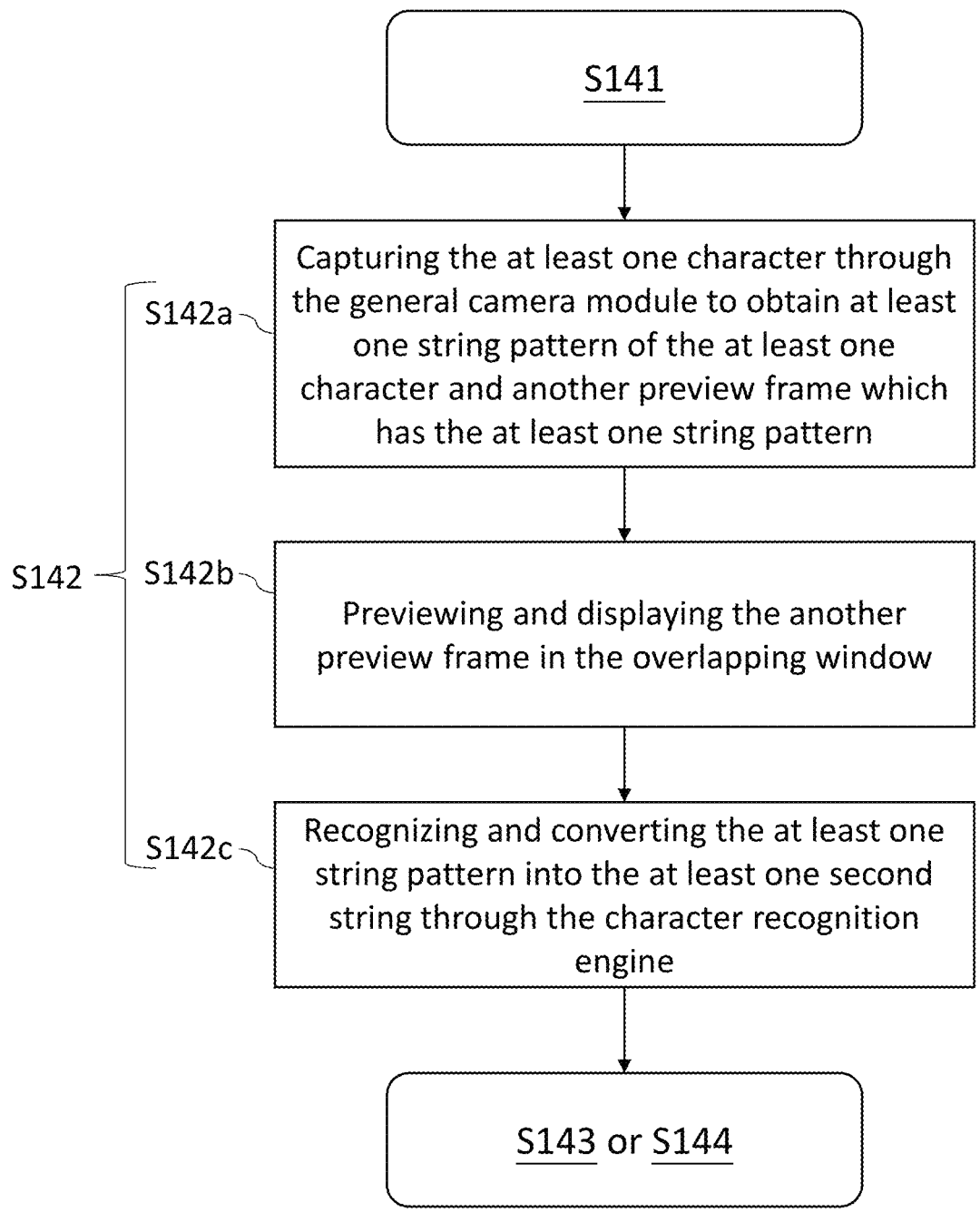
FIG. 15 illustrates a detailed flow chart of an embodiment of the step S142 in FIG. 14.

Please refer to FIG. 4, FIG. 13, and FIG. 14. In some embodiments, after step the S120 or the step S134, the control module 140 activates the character recognition input method in response to a character selection event for the other selection button 242 of the at least one selection button 241, 242 (step S141). In other words, in some embodiments, the selection button 242 corresponds to the OCR function. In some embodiments, the selection button 242 corresponding to the OCR function may be a physical button of the mobile device 10 or a virtual button on the overlapping window 240. Take the selection button 242 being the virtual button as an example, the character selection event may be that the user clicks the virtual button one time.

In some embodiments, the selection button 241 corresponding to the barcode-scanning function and the selection button 242 corresponding to the OCR function are both physical buttons of the mobile device 10 or are both virtual buttons on the overlapping window 240. In other embodiments, one of the at least one selection button 241, 242 is a physical button of the mobile device 10, and the other of the at least one selection button 241, 242 is a virtual button on the overlapping window 240.

After the step S141, the mobile device 10 can detect at least one character to obtain at least one string (hereinafter referred to as second strings, the step S142) through the character recognition input method.

Figure 16:
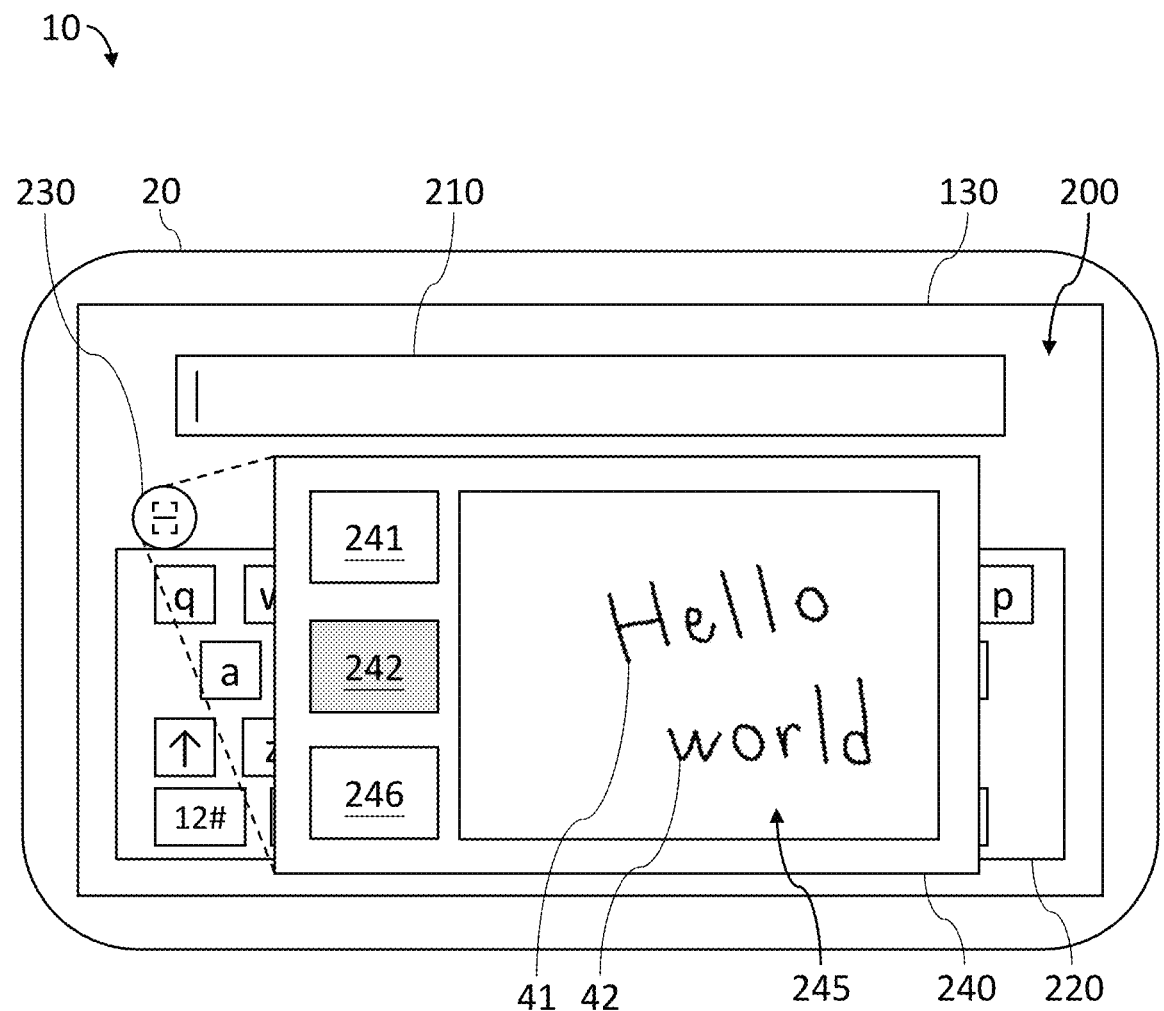
FIG. 16 illustrates a schematic view of an implementation of d an overlapping window in FIG. 6 after being processed via the step S142a and the step S142b in FIG. 15.

Please refer to FIG. 4 and FIG. 13 to FIG. 17. In some embodiments of the step S142, the general camera module 100 captures the at least one character to obtain at least one string pattern 41, 42 of the at least one character and to obtain another preview frame 245 having the at least one string pattern 41, 42 (the step S142a, as shown in FIG. 16).

Then, the control module 140 of the mobile device 10 controls the touch display module 130 to preview and to display the another preview frame 245 in the overlapping window 240 in a real-time manner (the step S142b, as shown in FIG. 16). After that, the mobile device 10 recognizes and converts the at least one string pattern 41, 42 into the at least one second string through the character recognition engine 150 (the step S142c, as shown in FIG. 17).

Figure 17:
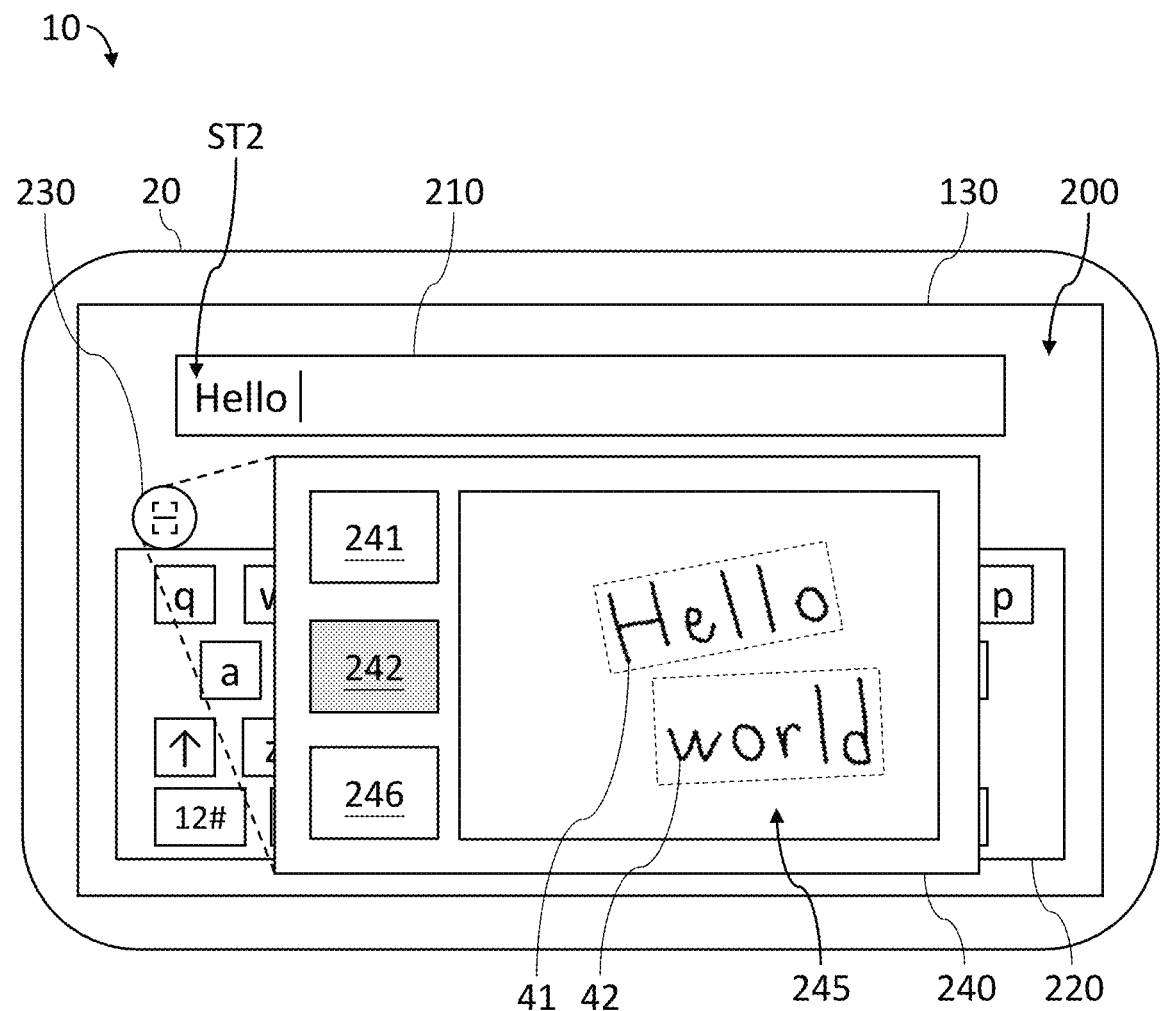
FIG. 17 illustrates a schematic view of an implementation of an overlapping window in FIG. 6 after being processed via the step S143 and the step S144 in FIG. 14.

Finally, the control module 140 displays any one of the second strings ST2 of the at least one second string in the input field 210 (the step S144, as shown in FIG. 17). Take two character patterns 41, 42 as an example, in the step S142c, the second string converted by the character pattern 41 is "Hello", and the second string converted by the character pattern 42 is "world". In addition, in the step S144, the second string ST2 which is "Hello" is displayed in the input field 210.

In some embodiments, when the at least one second string obtained in the step S142c includes a plurality of second strings, the control module 140 can control the touch display module 130 to display the plurality of second strings as input options of the input field 210 in the candidate field after the step S142c and before the step S144 (the step S143, not shown). After the user selects the second string ST2, the touch display module 130 displays the second string ST2 selected by the user in the input field 210 (the step S144, as shown in FIG. 17).

Figure 18:
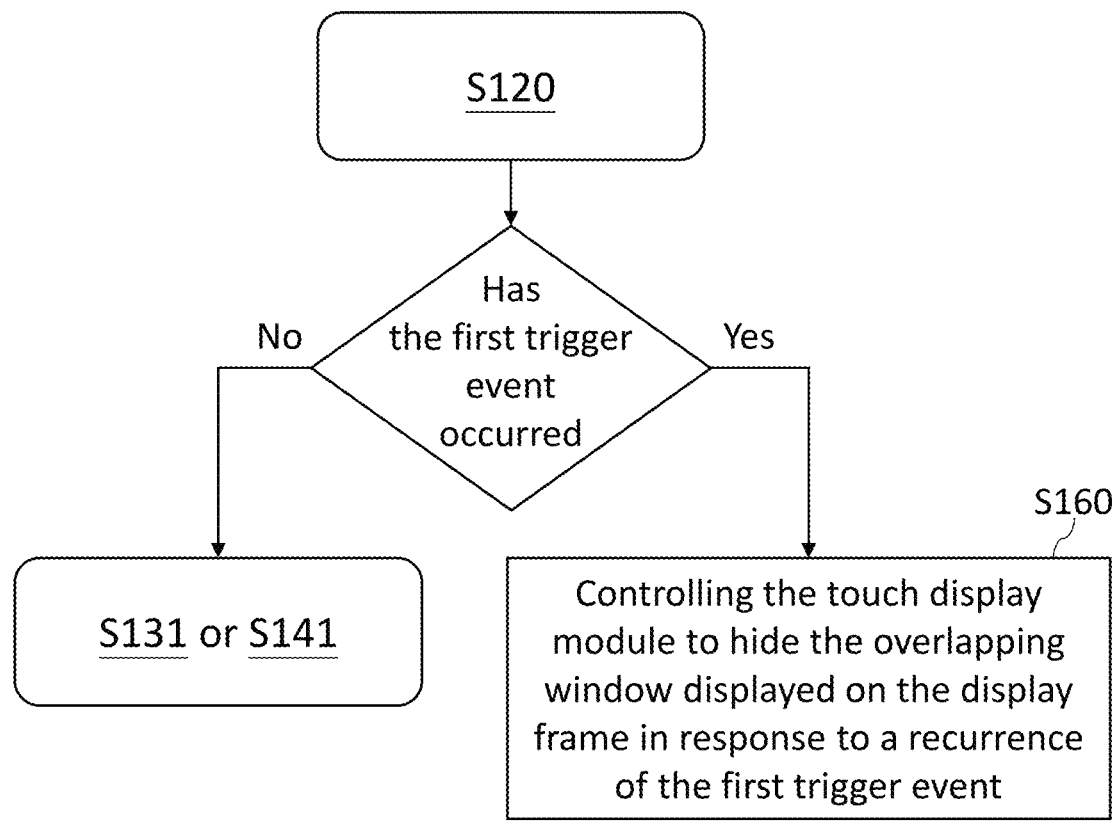
FIG. 18 illustrates a flow chart of a fourth embodiment following the step S120 in FIG. 4.

Please refer to FIG. 1, FIG. 4, FIG. 13, and FIG. 18. In some embodiments, after the step S120, the control module 140 controls the touch display module 130 to hide the overlapping window 240 displayed on the display frame 200 in response to a recurrence of the first trigger event (the step S160, as shown in FIG. 5). Following the previous example and taking that the first trigger event is an one-press operation as an example, when the overlapping window 240 is displayed on the display frame 200 (as shown in FIG. 6, FIG. 9, FIG. 10, FIG. 12, FIG. 16, and FIG. 17) and the user presses the trigger element 240 again, the control module 140 can hide the overlapping window 240 in the display frame 200 so as to make the touch display module 130 no longer display the overlapping window 240 on the display frame 200. It should be understood that, the step S160 shown in FIG. 18 is performed after the step S120 in a real-time manner, but the order of the steps is not a limitation for the present disclosure. The step S160 can be performed before or after any step after the step S120 (for example, any one of the steps S131-S134 and S141-S144) under reasonable circumstances.

Figure 19:
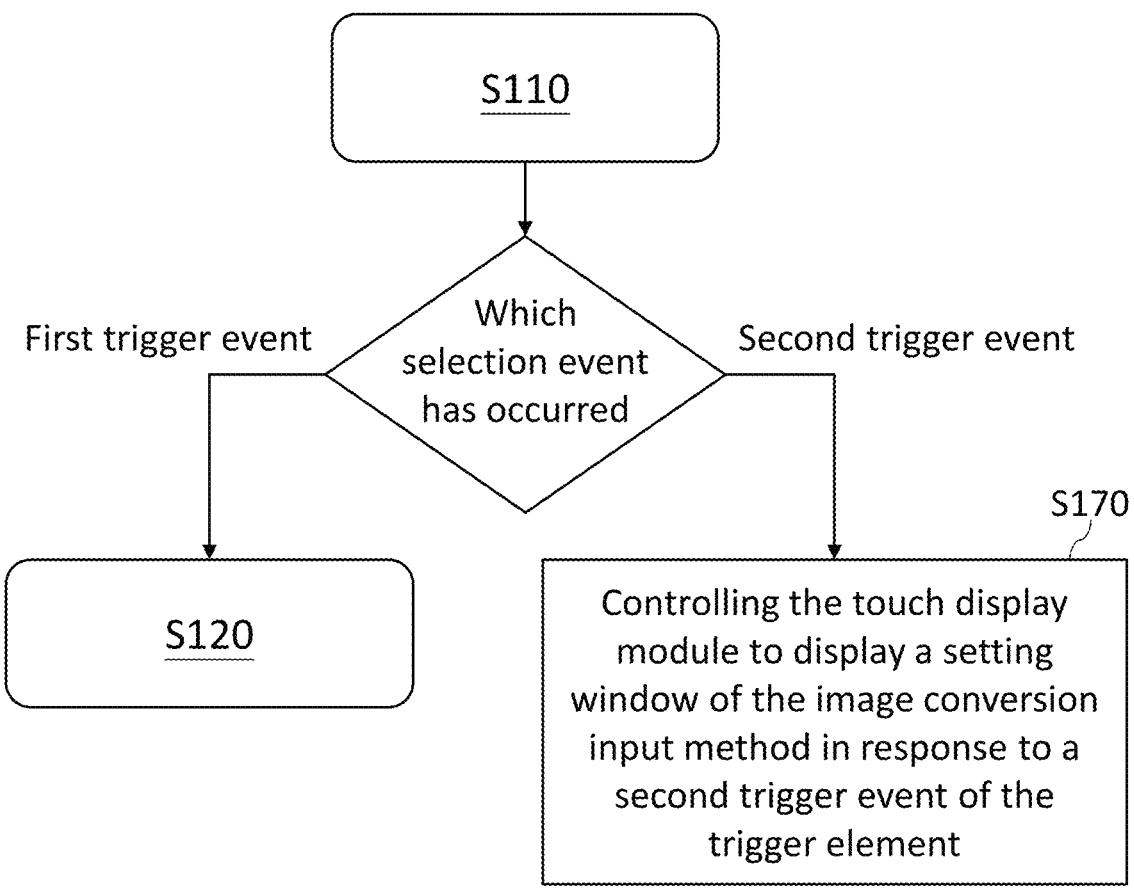
FIG. 19 illustrates a flow chart of an embodiment following the step S110 in FIG. 4.
Figure 20:
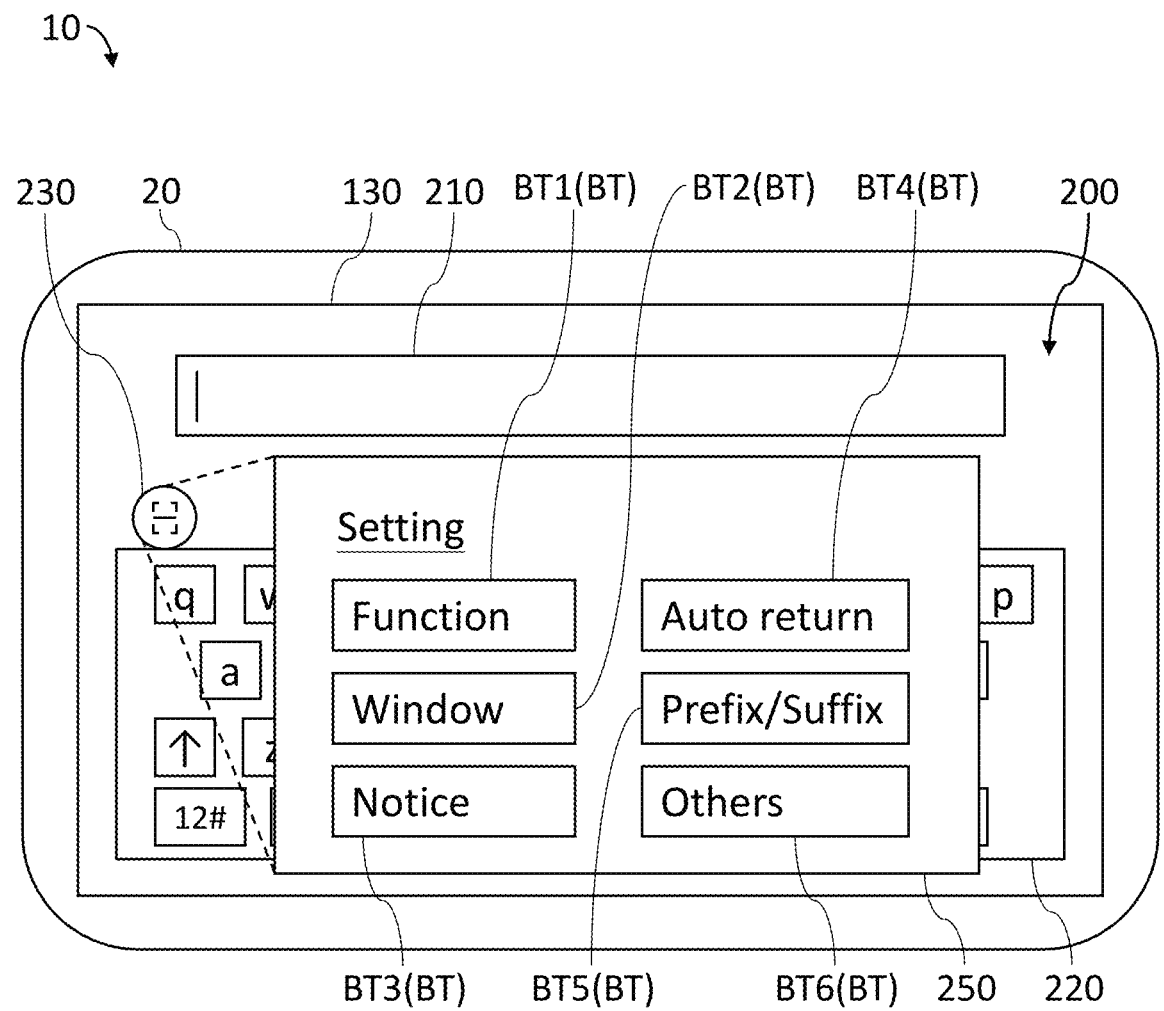
FIG. 20 illustrates a schematic view of an implementation of a trigger element in FIG. 6 after being processed via the step S170 in FIG. 19.

Please refer to FIG. 1, FIG. 4, FIG. 13, FIG. 19, and FIG. 20. In some embodiments, after the step S110, the control module 140 controls the touch display module 130 to display a setting window 250 of the image conversion input method in response to a second trigger event of the trigger element 230 (the step S170, as shown in FIG. 20). It should be understood that, the step S170 shown in FIG. 19 is performed after the step S110 in a real-time manner, but the order of the steps is not a limitation for the present disclosure. The step S170 can be performed before or after any step after the step S110 (for example, any one of the steps S120, S131-S134, S141-S144, and S160) under reasonable circumstances.

In some embodiments, the first trigger event and the second trigger event are different trigger events. In some embodiment, the first trigger event is a short press operation, and the second trigger event is a long press operation. In some embodiments, the short press operation is, for example, a single press or an operation that presses for 1 second and releases, and the present disclosure is not limited thereto. The long press operation is, for example, an operation that presses for more than 3 seconds, and the present disclosure is not limited thereto.

In some embodiments, the mobile device 10 can adjust the image conversion input method and various functions of the overlapping window 240 of the image conversion input method through the setting window 250.

Please refer to FIG. 20. In some embodiments, the setting window 250 has a plurality of virtual buttons BT, and each of the plurality of virtual buttons BT has a corresponding setting or a corresponding function. For example, the button BT1 of "function" is configured to adjust detailed settings of OCR function, QR code scanning function, and the barcode-scanning function (for example, an automatic/manual function setting of barcode-scanning function). The button BT2 of "Windows" is configured to set the size of the overlapping window 240 and the position of the overlapping window 240. The button BT3 of "Notice" is configured to set a switch of sound notification and/or a switch of vibration notification when the recognition operation or the scanning operation is successful. The button BT4 of "Prefix/Suffix" is configured to set a switch for adding a prefix/suffix string before and after the at least one first string. The button BT5 of "Auto return" is configured to set a switch for hiding the overlapping window 240 automatically or manually after the recognition operation or the scanning operation is successful. The button BT6 of "Others" is configured to perform other detailed settings related to the overlapping window 240 (for example, appearance settings of language or background).

Figure 21:
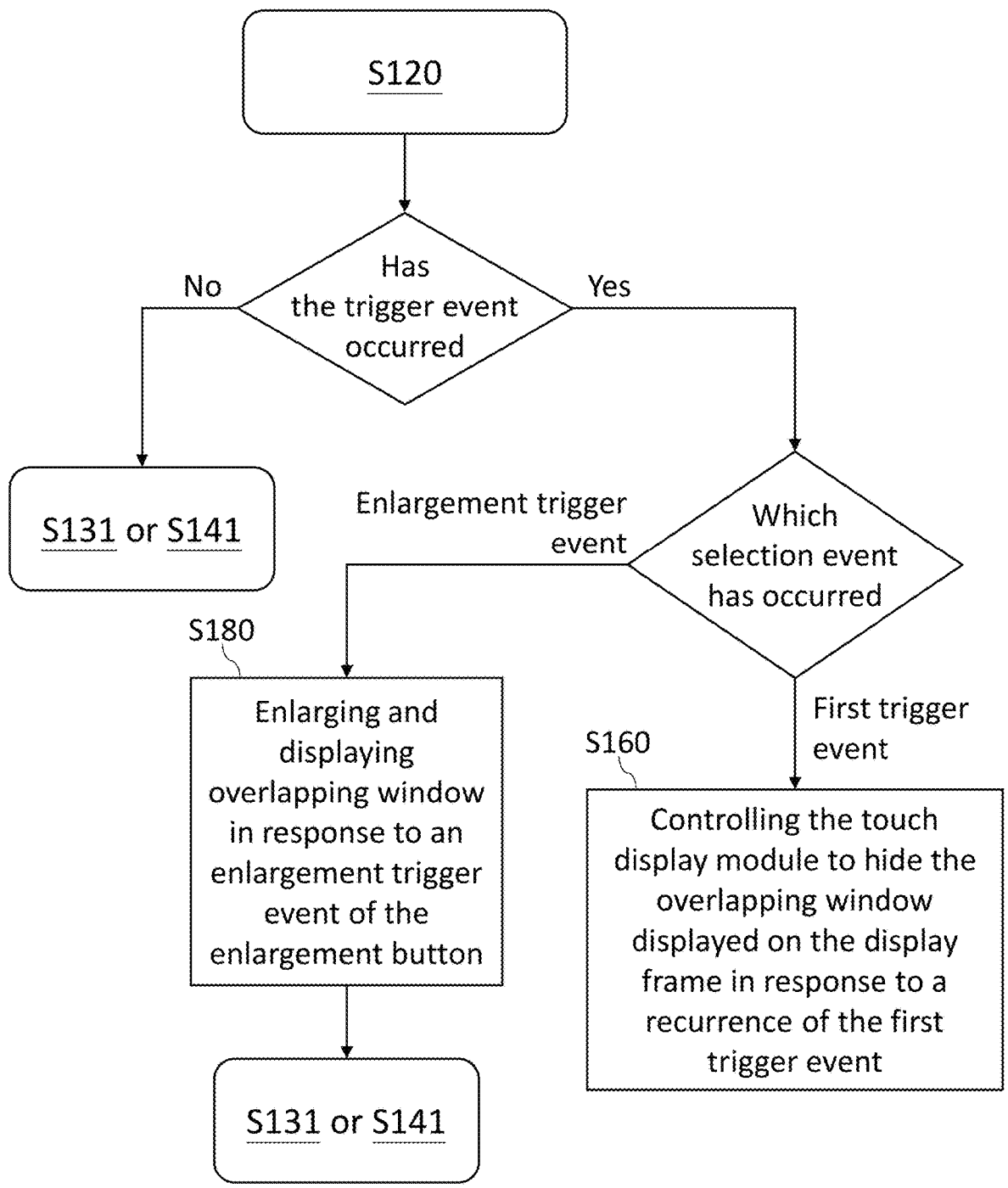
FIG. 21 illustrates a flow chart of a fifth embodiment following the step S120 in FIG. 4.

Please refer to FIG. 1, FIG. 4, FIG. 6, FIG. 13, FIG. 21, and FIG. 22. In some embodiments, the overlapping window 240 may include an enlargement button 246. After the step S120, the control module 140 controls the touch display module 130 to enlarge and display the overlapping window 240 in response to an enlargement trigger event (for example, the enlargement button 246 is pressed and selected) of the enlargement button 246 (the step S180, as shown in FIG. 21). It should be understood that, the step S180 shown in FIG. 21 is performed after the step S120 in a real-time manner, but the order of the steps is not a limitation for the present disclosure. The step S180 can be performed before or after any step after the step S120 (for example, any one of the steps S131-S134 and S141-S144) under reasonable circumstances.

Figure 22:
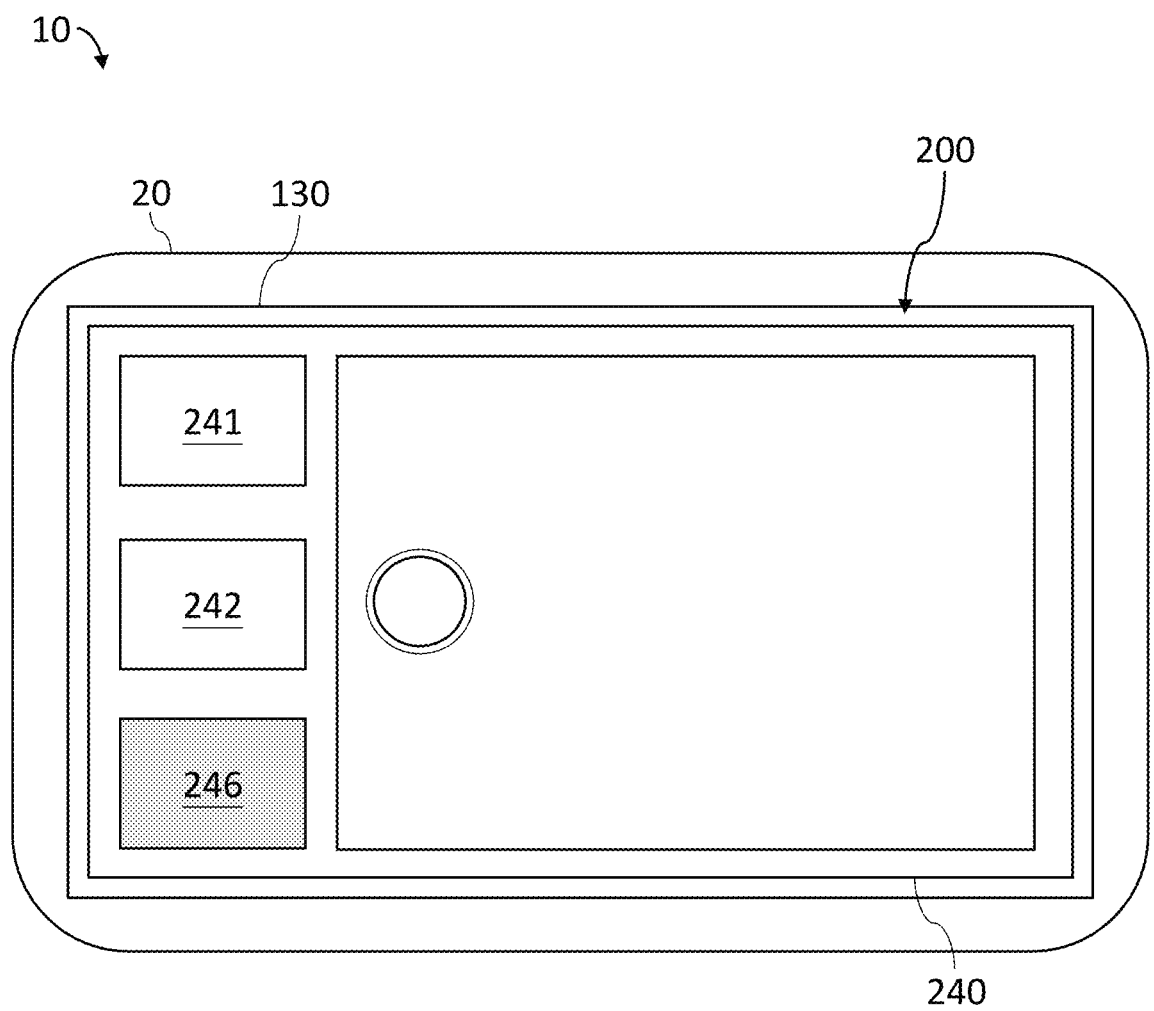
FIG. 22 illustrates a schematic view of an implementation of an overlapping window in FIG. 6 after being processed via the step S180 in FIG. 21.

In some embodiments in the step S180, the control module 140 controls the touch display module 130 to display the overlapping window 240 in full screen in response to the enlargement trigger event of the enlargement button 246. In some embodiments, the display frame 200 has a first size, the overlapping window 240 before enlarging has a second size, and the overlapping window 240 after enlarging has a third size. In some embodiments, the second size is smaller than the first size, the third size is larger than the second size, and the third size is smaller than or equal to the first size. In some embodiments, the second size and/or the third size of the overlapping window 240 can be set through the setting window 250 of the image conversion input method. For example, the third size of the overlapping window 240 is substantially equal to the first size of the display frame 200 (as shown in FIG. 22).

In some embodiments, the general camera module 100 and the specific camera module 110 may be photosensitive elements, respectively, wherein the photosensitive element is configured to sense a pattern and convert the pattern into an electronic signal, such as but not limited to a chargecoupled device (CCD) or a complementary metal-oxide-semiconductor (CMOS) sensor.

In some embodiments, the barcode-decoding module 120 and the character recognition engine 150 may be hardware components, respectively, wherein the hardware component has an operating function, such as but not limited to a microprocessor, a graphics processing unit (GPU), an embedded controller, or a microcontroller unit (MCU).

In some embodiments, the barcode-decoding module 120 converts the at least one barcode pattern into the at least one first string according to data in a database built in the mobile device 10, and the character recognition engine 150 converts the at least one string pattern into the at least one second string according to the data in a database built in the mobile device 10.

In some embodiments, the mobile device 10 is coupled to a cloud database in a way of wireless communication through a communication module (not shown). In some embodiments, the barcode-decoding module 120 converts the at least one barcode pattern into the at least one first string according to data in the cloud database, and the character recognition engine 150 converts the at least one string pattern into the at least one second string according to the data in the cloud database.

In some embodiments, the touch display module 130 may be a display device which has a touch function, such as but not limited to a resistive touch panel, a capacitive touch panel, an infrared touch panel, an optical touch panel, or a surface acoustic wave touch panel.

In some embodiments, the control module 140 may be a hardware component which has a logic processing function, such as but not limited to a central processing unit (CPU), a microprocessor, a digital signal processor (DSP), a complex programmable logic device (CPLD), a field programmable gate array (FPGA), an application specific integrated circuit (ASIC), or an MCU.

In some embodiments, the barcode-decoding module 120, the character recognition engine 150, and the control module 140 may be three hardware components, and each of the three hardware components has a signal processing function.

In other embodiments, the specific camera module 110 and the barcode decoding module 120 may be integrated into an individual hardware component, that is, a barcode engine (also referred to as a barcode-scanning module). The character recognition engine 150 and the control module 140 may be realized using a single hardware component which has a signal processing function.

In some other embodiments, the barcode-decoding module 120, the character recognition engine 150, and the control module 140 may be realized using a single hardware component which has a signal processing function.

In conclusion, according to any one of embodiments, the mobile device or the operating method of the input method thereof have both the system default input method and the image conversion input method so as to provide diverse input functions. Therefore, the user can select an appropriate input method for input operations (such as but not limited to a Chinese/English input, a barcode-scanning input, or an OCR input) when performing a character input of any one of input fields so as to improve the convenience and the efficiency of the character input.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the description of the preferred embodiments described above.

What is claimed is:

1. A mobile device comprising:
a general camera module;
a specific camera module;
a barcode-decoding module electrically connected to the specific camera module, wherein the barcode-decoding module is configured to capture at least one barcode pattern through the specific camera module and convert the at least one barcode pattern into at least one first string, wherein each of the at least one barcode pattern is generated by using the specific camera module to capture at least one barcode;
a touch display module configured to display a display frame, wherein the display frame has an input field; and
a control module electrically connected to the general camera module, the specific camera module, and the touch display module, wherein the control module is configured to activate a virtual keyboard window of a system default input method and a trigger element of an image conversion input method in response to an input trigger event of the input field, and the control module is configured to control the touch display module to display an overlapping window of the image conversion input method on the display frame overlappingly in response to a first trigger event of the trigger element.

2. The mobile device according to claim 1, wherein the trigger element is a virtual button, and the virtual button, the input field, and the virtual keyboard window are displayed on the display frame at the same time.

3. The mobile device according to claim 1, wherein the control module is further configured to control the touch display module to hide the overlapping window displayed on the display frame in response to a recurrence of the first trigger event.

4. The mobile device according to claim 3, wherein the first trigger event is a short press operation.

5. The mobile device according to claim 1, wherein the control module is further configured to control the touch display module to display a setting window of the image conversion input method in response to a second trigger event of the trigger element.

6. The mobile device according to claim 5, wherein the second trigger event is a long press operation.

7. The mobile device according to claim 1, further comprising at least one selection button, wherein the specific camera module is configured to capture a preview frame having the at least one barcode pattern, the control module is further configured to activate the barcode-decoding module in response to a barcode selection event of the at least one selection button, and the control module is further configured to display the preview frame in the overlapping window in a real-time manner after the control module activates the barcode-decoding module and display one of the at least one first string in the input field.

8. The mobile device according to claim 7, wherein the at least one barcode pattern comprises a plurality of barcode patterns, the overlapping window further has a candidate field, the candidate field is above the overlapping window, and the control module is further configured to display the at least one first string as input options of the input field in the candidate field after the control module activates the barcode-decoding module.

9. The mobile device according to claim 7, further comprising:

a character recognition engine disposed between the general camera module and the control module, wherein the character recognition engine is configured to capture at least one string pattern and another preview frame having the at least one string pattern through the general camera module, and the character recognition engine is configured to recognize and convert each of the at least one string pattern into at least one second string, and wherein each string pattern is generated by using the general camera module to capture at least one character.

10. The mobile device according to claim 9, wherein the control module is further configured to activate the character recognition engine correspondingly in response to a character selection trigger event of the at least one selection button, and the control module is configured to display the another preview frame in the overlapping window in a real-time manner after the control module activates the character recognition engine and display one of the at least one second string in the input field.

11. The mobile device according to claim 1, wherein the overlapping window comprises an enlargement button, and the control module is further configured to control the touch display module to enlarge and display the overlapping window in response to an enlargement trigger event of the enlargement button.

12. An operating method for an input method of a mobile device, comprising:

displaying an input field on a display frame;

activating a system default input method and an image conversion input method through the input field in order to display the input field, a virtual keyboard window of the system default input method, and a trigger element of the image conversion input method on the display frame at the same time, wherein the trigger element is a virtual button; and controlling a touch display module to display an overlapping window of the image conversion input method on the display frame overlappingly in response to a first trigger event of the trigger element, wherein the overlapping window is linked to a general camera module or a specific camera module.

13. The operating method according to claim 12, further comprising:

controlling the touch display module to hide the overlapping window displayed on the display frame in response to a recurrence of the first trigger event.

14. The operating method according to claim 13, wherein the first trigger event is a short press operation.

15. The operating method according to claim 12, further comprising:

controlling the touch display module to display a setting window of the image conversion input method in response to a second trigger event of the trigger element.

16. The operating method according to claim 15, wherein the second trigger event is a long press operation.

17. The operating method according to claim 12, wherein the image conversion input method comprises a barcode-scanning input method, and the operating method further comprises:

activating the barcode-scanning input method in response to a barcode selection event;

scanning at least one barcode through the barcode-scanning input method to obtain at least one first string, wherein the step of scanning the at least one barcode through the barcode-scanning input method comprises:

capturing the at least one barcode through the specific camera module to obtain at least one barcode pattern of the at least one barcode; and decoding the at least one barcode pattern into the at least one first string through a barcode-decoding module; and displaying one of the at least one first string in the input field.

18. The operating method according to claim 17, wherein in the step of capturing the at least one barcode through the specific camera module, a preview frame having the at least one barcode pattern is further obtained, and the step of scanning at least one barcode through the barcode scanning input method further comprises:

previewing and displaying the preview frame in the overlapping window.

19. The operating method according to claim 17, wherein the at least one first string comprises a plurality of first strings, the overlapping window further has a candidate field, the candidate field is above the overlapping window, and the operating method further comprises:

displaying the plurality of first strings as input options of the input field in the candidate field.

20. The operating method according to claim 17, wherein the image conversion input method further comprises a character recognition input method, the mobile device further comprises a character recognition engine, and the operating method further comprises:

activating the character recognition input method in response to a character selection event;

detecting at least one character through the character recognition input method to obtain at least one second string, wherein the step of detecting at least one character through the character recognition input method comprises:

capturing the at least one character through the general camera module to obtain at least one string pattern of the at least one character and another preview frame which has the at least one string pattern;

previewing and displaying the another preview frame in the overlapping window; and recognizing and converting the at least one string pattern into the at least one second string through the character recognition engine; and displaying one of the at least one second string in the input field.

21. The operating method according to claim 12, wherein the overlapping window comprises an enlargement button, and the operating method further comprises:

enlarging and displaying the overlapping window in response to an enlargement trigger event of the enlargement button.

* * * * *